United States Patent
Kaeb et al.

(10) Patent No.: US 12,433,188 B2
(45) Date of Patent: Oct. 7, 2025

(54) SEED METERING AND DISCHARGE SYSTEM WITH ADJUSTABLE GATE CONTROL

(71) Applicant: KSi Conveyor, Inc., Sabetha, KS (US)

(72) Inventors: Jason Kaeb, Sabetha, KS (US); Dominic Meyer, Sabetha, KS (US); Corbin Anliker, Sabetha, KS (US)

(73) Assignee: KSi Conveyor, Inc., Sabetha, KS (US)

( * ) Notice: Subject to any disclaimer, the term of this patent is extended or adjusted under 35 U.S.C. 154(b) by 0 days.

(21) Appl. No.: 19/112,082

(22) PCT Filed: Jan. 12, 2024

(86) PCT No.: PCT/US2024/011318
§ 371 (c)(1),
(2) Date: Mar. 14, 2025

(87) PCT Pub. No.: WO2024/155515
PCT Pub. Date: Jul. 25, 2024

(65) Prior Publication Data
US 2025/0255212 A1 Aug. 14, 2025

Related U.S. Application Data

(60) Provisional application No. 63/591,967, filed on Oct. 20, 2023, provisional application No. 63/491,553, (Continued)

(51) Int. Cl.
*A01C 7/10* (2006.01)
*A01C 23/04* (2006.01)
*G05D 7/06* (2006.01)

(52) U.S. Cl.
CPC ............ *A01C 7/107* (2013.01); *A01C 23/04* (2013.01); *G05D 7/0611* (2013.01); *A01C 7/102* (2013.01)

(58) Field of Classification Search
None
See application file for complete search history.

(56) References Cited

U.S. PATENT DOCUMENTS

| | | |
|---|---|---|
| 3,259,199 A | 7/1966 | Noble et al. |
| 4,756,348 A | 7/1988 | Moller |

(Continued)

FOREIGN PATENT DOCUMENTS

| | | |
|---|---|---|
| DE | 102014105423 A1 | 10/2015 |
| KR | 100773067 B1 | 11/2007 |

(Continued)

OTHER PUBLICATIONS

Toolots Store, 10-Head Multihead Weigher Weighing Range 10-1500g, Dynamic Quantitative Packaging System, Jul. 2, 2021, 1 page, Toolots Reliable Equipment Fast, www.toolots.com.

(Continued)

*Primary Examiner* — Daniel L Greene
(74) *Attorney, Agent, or Firm* — Coughlin Law Office LLC; Stuart M. Aller; Daniel J. Coughlin

(57) ABSTRACT

Disclosed is an automated agricultural seed discharge system and method with adjustable gate control for seed metering. The method includes a step of receiving a stream of agricultural seed into a metering assembly. The method then includes a step of determining an inflow rate of the stream of agricultural seed based on a measurement of the agricultural seed within the metering assembly. Further, the method includes a step of commanding an adjustable gate into a command position to discharge the agricultural seed from the metering assembly at an outflow rate that matches the inflow rate.

32 Claims, 17 Drawing Sheets

Related U.S. Application Data filed on Mar. 22, 2023, provisional application No. 63/480,048, filed on Jan. 16, 2023.

(56) References Cited

U.S. PATENT DOCUMENTS

| | | | |
|---|---|---|---|
| 4,867,343 | A | 9/1989 | Ricciardi et al. |
| 4,944,428 | A | 7/1990 | Gmur et al. |
| 6,447,674 | B1 | 9/2002 | Simon et al. |
| 6,582,516 | B1 | 6/2003 | Carlson |
| 8,393,502 | B2 | 3/2013 | Renyer et al. |
| 8,644,993 | B1 | 2/2014 | Craft et al. |
| 9,675,001 | B2 | 6/2017 | Meyer et al. |
| 9,889,785 | B1 | 2/2018 | Van Horn |
| 11,698,285 | B2 | 7/2023 | Rajagopal et al. |
| 12,000,726 | B2 | 6/2024 | Helfenstein et al. |
| 2007/0289783 | A1 | 12/2007 | Tump |
| 2008/0119993 | A1* | 5/2008 | Breed .................... G01S 7/023 701/45 |
| 2012/0017812 | A1 | 1/2012 | Renyer et al. |
| 2012/0181093 | A1 | 7/2012 | Fehr et al. |
| 2014/0318009 | A1 | 10/2014 | Strahm et al. |
| 2016/0234998 | A1* | 8/2016 | Gebbeken ............... A01C 7/127 |
| 2016/0302352 | A1 | 10/2016 | Tramp et al. |
| 2017/0086356 | A1* | 3/2017 | Schweitzer ............ A01C 5/068 |
| 2019/0059205 | A1 | 2/2019 | Meyer et al. |
| 2022/0081228 | A1 | 3/2022 | Johnson |

FOREIGN PATENT DOCUMENTS

| | | | |
|---|---|---|---|
| WO | 2020212868 | A1 | 10/2020 |
| WO | 23064673 | A1 | 4/2023 |
| WO | 2023081712 | A1 | 5/2023 |

OTHER PUBLICATIONS

Precia Molen Na, Hopper scale ABS-X Ex, Bulk Discontinuous Weighing: Automatic Bulk Scales, Aug. 15, 2022, 2 pages, Precia Molen Worldwide Weighing, North America, https://us.preciamolen.com.

AGCO, Material Handling Solutions, Bulk Weighers, Mar. 2016, 12 pages, IS-107, GSI, www.grainsystems.com.

Aaron, DocuSign Envelope, Aug. 19, 2021, 4 pages, Change Level 03, KSi, Sabetha, Kansas, USA.

Brabender Technologie GMBH & Co. KG, Dosing differential balance for liquid dosing, DE102014105423A1, Oct. 22, 2015, 6 pages, Google Patents—this is a machine translation of a foreign patent originally published on Oct. 22, 2015, German Patent and Trade Mark Office, Germany, https://patents.google.com/patent/DE102014105423A1/en.

Weigh Right, Model iQ-1E, Self Adjusting Entry Level Scale, Jul. 2, 2021, 2 pages, Weigh Right Automatic Scale Co., www.weighright.com.

Ecnnet Co. Ltd, et al., The blending method and the apparatus for auto-controlling ratio of size of recycling aggregate, KR100773067B1, Nov. 2, 2007, 9 pages, Google Patents—this is a machine translation of a foreign patent originally published on Nov. 2, 2007, Korean Intellectual Property Office, South Korea, https://patents.google.com/patent/KR100773067B1/en.

KSi, KSi AutoTreat V4.2 System User's Manual, KSi Automation, Sep. 9, 2015, 84 pages, vol. 1, KSi Conveyors, Inc., Sabetha, KS.

Precia Molen Na, ABS-X Ex Hopper Scale, Bulk Dry Granular Product Weighing, Jun. 21, 2022, 2 pages, Precia Molen Worldwide Weighing, North America, www.preciamolen.com.

Paul A. Kaeb, Public Sale Disclosure Statement, Sep. 2, 2021, 1 page, KSi Conveyor, Inc., Sabetha, KS.

Aaron Zientara, SC 03 Quote, DocuSign Envelope, Aug. 19, 2021, 2 pages, KSi Conveyors Inc, Sabetha, KS.

Flexicon, Weigh Batching Systems, Bulk Handling Equipment and Systems, Jul. 2, 2021, 3 pages, Flexicon Corporation, https://www.flexicon.com/Bulk-Handling-Equipment-and-Systems/Weigh-Batching-Systems/.

Shane Thomas, International Search Report & Written Opinion, Notification of Transmittal, Dec. 15, 2022, 18 pages, International Searching Authority/US, Alexandria, Virginia, United States of America.

Kari Rodriquez, International Search Report & Written Opinion, Notification of Transmittal, Apr. 17, 2024, 6 pages, International Searching Authority/US, Alexandria, Virginia, United States of America.

\* cited by examiner

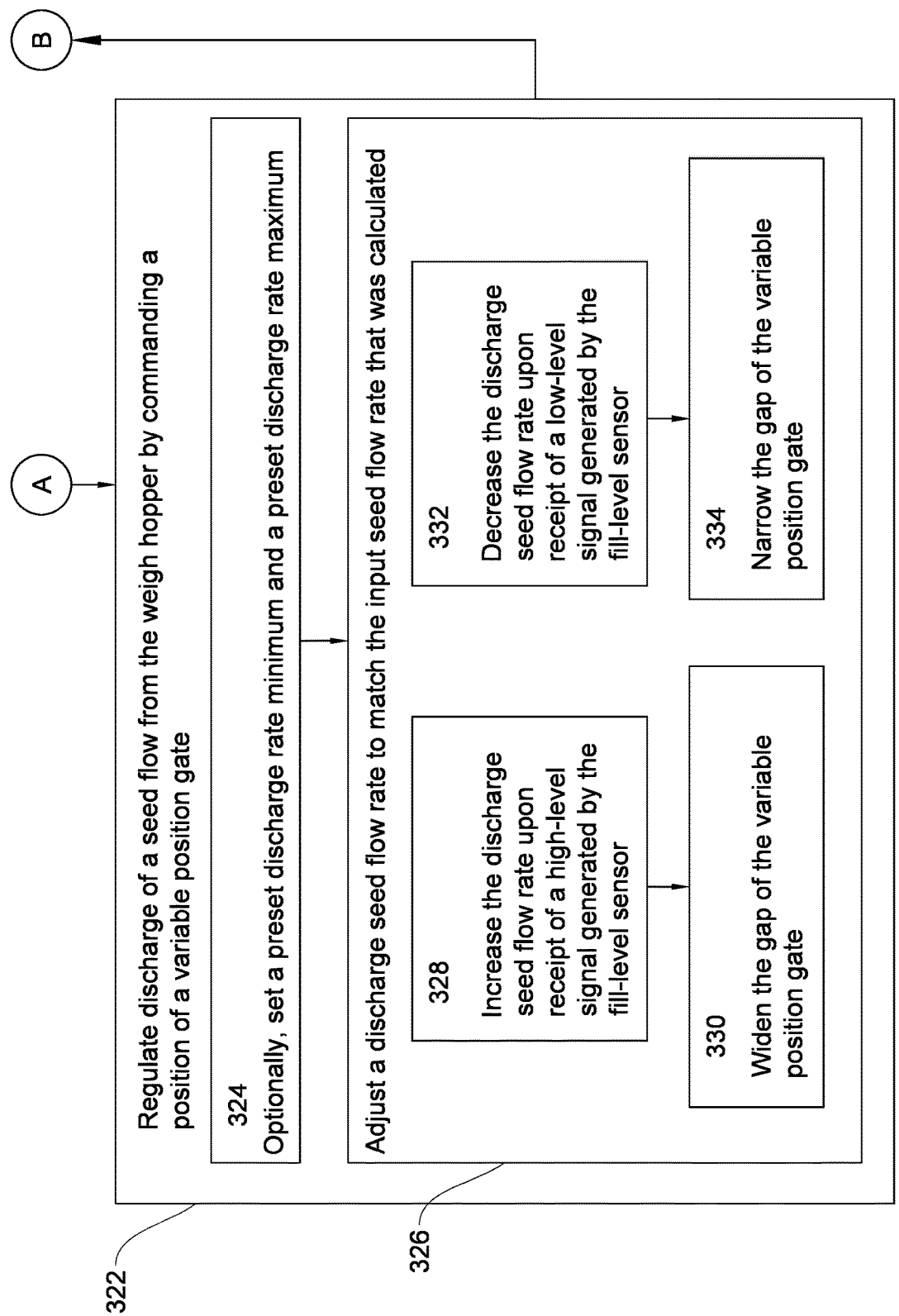
FIG. 3 (CONTINUATION)

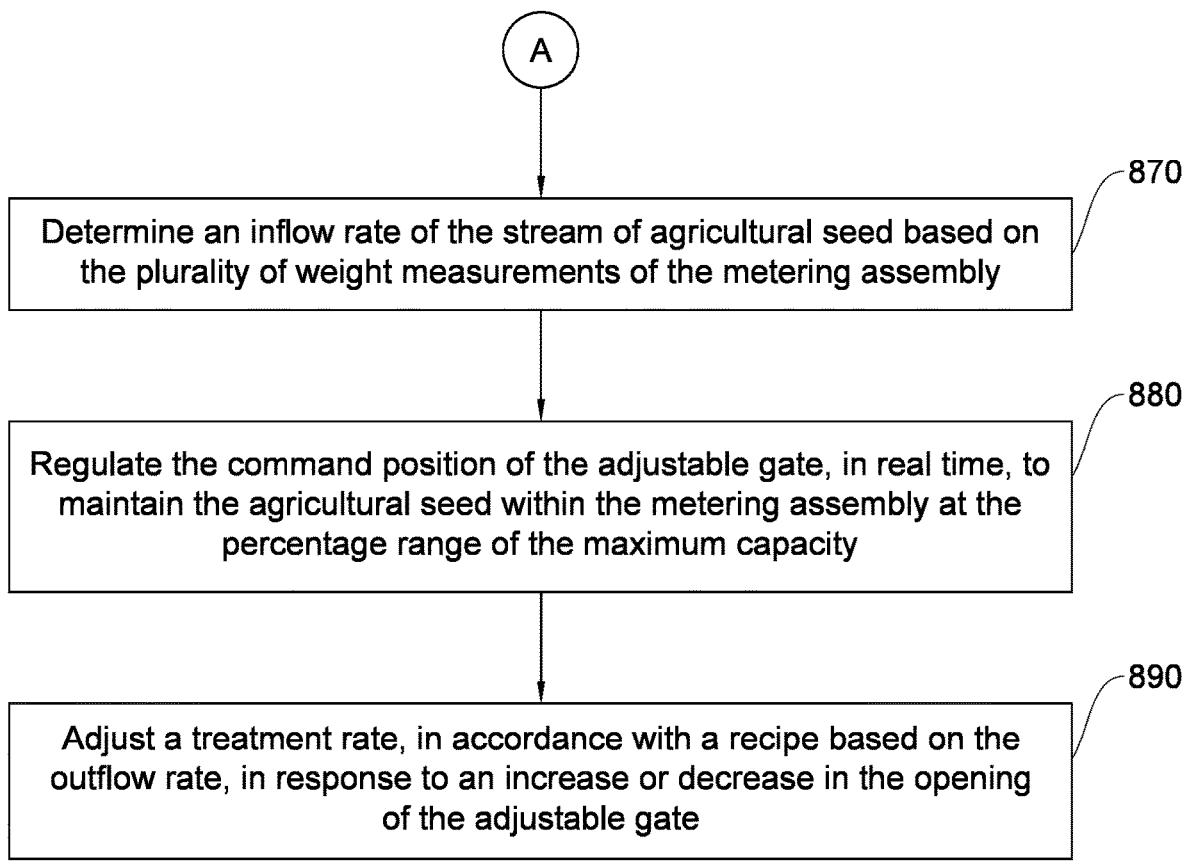
FIG. 8 (CONTINUATION)

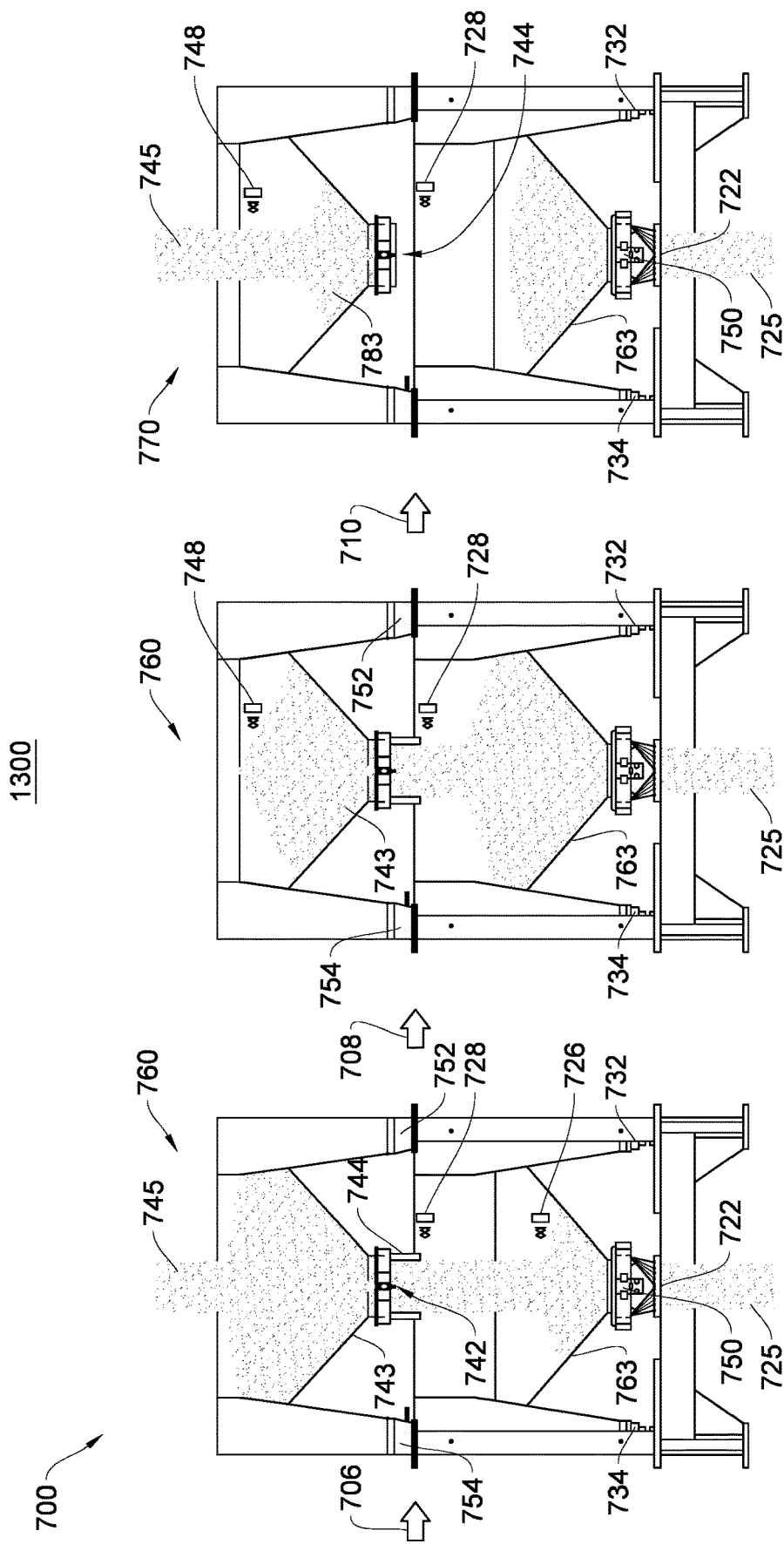

US 12,433,188 B2

SEED METERING AND DISCHARGE SYSTEM WITH ADJUSTABLE GATE CONTROL

CROSS-REFERENCES TO RELATED APPLICATIONS

This patent application is an international application which claims the benefit of U.S. Provisional Patent Application No. 63/480,048, entitled "Methods for Maintaining a Continuously Metered Seed Flow," filed on Jan. 16, 2023, and U.S. Provisional Patent Application No. 63/491,553, entitled "Methods for Maintaining a Continuously Metered Seed Flow," filed on Mar. 22, 2023, and U.S. Provisional Patent Application No. 63/591,967, entitled "Agricultural Seed Discharge System with Adjustable Gate Control for Seed Metering," filed on Oct. 20, 2023, the entire contents of which are incorporated herein by reference in their entirety.

BACKGROUND OF THE INVENTION

Technical Field

The invention presented herein is generally directed toward an automated agricultural seed metering and discharge system with adjustable gate control and an automated method for seed metering, more particularly, to the control, metering, and continuous discharge of large volumes of particulate materials in bulk form, such as crop seeds, from a metering assembly that is operable to measure an inflow rate of an inflowing stream of particulate material and adjust a variable gate position in response so that an outflow rate of an outflow stream of particulate material matches the inflow rate.

Description of the Related Art

Bulk materials, particularly crop seeds, are commonly stored in elevated hoppers, from which the material is discharged for distribution or utilization. The release of seeds can occur either manually or automatically, either based on a predetermined time schedule or a specified weight. Various mechanisms, including drop gates, seed wheels, and adjustable slide gates, are employed to regulate the flow of seeds from the hopper. Before planting, the discharged seeds may undergo applications of different nutrients, inoculants, fungicides, and pesticides. These seed treatments are applied to enhance the size, health, and overall value of the crop produced by the seeds.

SUMMARY OF THE INVENTION

An automated agricultural seed metering and discharge system with adjustable gate control and an automated method for seed metering are provided, as shown in and/or described in connection with at least one of the figures.

One aspect of the present disclosure relates to an automated agricultural seed discharge method that includes a step of receiving a stream of agricultural seed into a metering assembly. The method then includes a step of determining an inflow rate of the stream of agricultural seed based on a measurement of the agricultural seed within the metering assembly. Further, the method includes a step of commanding an adjustable gate into a command position to discharge the agricultural seed from the metering assembly at an outflow rate that matches the inflow rate.

In some aspects, the automated method includes steps of receiving the stream of agricultural seed into an upper hopper of the metering assembly; measuring the weight of the agricultural seed within the upper hopper; and discharging the agricultural seed from the upper hopper, with a binary gate mounted to the upper hopper, into a lower hopper of the metering assembly.

In some aspects, the automated method includes a step of adjusting the command position of the adjustable gate that is mounted to the lower hopper to regulate the outflow rate from the lower hopper to match the inflow rate into the upper hopper.

In some aspects, the adjustable gate is continuously adjusted while the binary gate is closed.

In some aspects, the automated method includes the step of determining a set point for the command position of the adjustable gate while the binary gate is closed. In an aspect, the set point is based on the measurement of the agricultural seed within the metering assembly. In additional method examples, the automated method includes a step of setting the command position of the adjustable gate at the set point when the binary gate is opened.

In some aspects, the automated method includes a step of maintaining the command position of the adjustable gate at the set point during a refill period.

In some aspects, the automated method includes a step of maintaining the command position at a set point until a load cell mounted to the metering assembly reports a loss-in-weight over a refill period.

In some aspects, the refill period is an interval of time between 0.1 second and 30 seconds.

In some aspects, the automated method includes a step of decreasing an opening created by the adjustable gate upon a loss-in-weight of the metering assembly over a measurement period.

In some aspects, the automated method includes a step of increasing an opening created by the adjustable gate upon a gain-in-weight of the metering assembly over a measurement period.

In some aspects, the automated method includes a step of commanding a treatment rate based on the command position of the adjustable gate.

In some aspects, the automated method includes a step of applying a treatment to the agricultural seed discharged according to a recipe based on the outflow rate.

In some aspects, the automated method includes steps of increasing a treatment flow rate in response to an increase in an opening of the adjustable gate; and decreasing the treatment rate in response to a decrease in the opening of the adjustable gate.

In some aspects, the inflow rate is determined based on a measurement of weight during a measurement period between receiving a low-level signal and a high-level signal.

In some aspects, the automated method includes a step of filling the metering assembly with agricultural seed at a percentage range of between 5 percent to 80 percent of the maximum capacity of the metering assembly.

In some aspects, the automated method includes a step of adjusting the command position of the adjustable gate to maintain the agricultural seed within the metering assembly at the percentage range of between 5 percent to 80 percent of the maximum capacity.

In some aspects, the automated method includes steps of measuring the weight of the agricultural seed within the metering assembly; receiving a plurality of weight measurements of the metering assembly; and regulating the command position of the adjustable gate based upon the plurality of weight measurements in real-time.

In some aspects, the automated method includes steps of setting the command position of the adjustable gate at a set point during a calibration period; discharging, over the calibration period, a portion of the agricultural seed through an opening created by the adjustable gate at the command position; and associating the outflow rate with the command position of the adjustable gate at the set point.

In some aspects, the automated method includes a step of obtaining a plurality of outflow rates that correspond with a plurality of command positions of the adjustable gate.

In some aspects, the automated method includes a step of storing the plurality of outflow rates that correspond with the plurality of command positions in a database accessible by a controller.

In some aspects, the automated method includes a step of adjusting a treatment rate according to a recipe based on the outflow rate.

In some aspects, the automated method includes steps of generating a signal upon a change in the command position of the adjustable gate to a second position; and adjusting the treatment rate to correspond with the outflow rate correlated with the second position upon generation of the signal.

The above advantages and features are of representative embodiments only and are presented only to assist in understanding the invention. It should be understood that they are not to be considered limitations on the invention as defined by the claims. Additional features and advantages of embodiments of the invention will become apparent in the following description, from the drawings, and from the claims.

Other embodiments and advantages will become readily apparent to those skilled in the art upon viewing the drawings and reading the detailed description hereafter, all without departing from the scope of the disclosure. The drawings and detailed descriptions presented are to be regarded as illustrative in nature and not in any way as restrictive.

Other features of the examples will be apparent from the drawings and from the detailed description that follow.

BRIEF DESCRIPTION OF THE DRAWINGS

Aspects are illustrated by way of example, and not by way of limitation, in the accompanying drawings, wherein:

FIG. 13D shows a first refill period in a series of chronological depictions of the metering assembly operating under a fixed position mode during the continuous discharge cycle.

FIG. 13E shows the first refill period in a series of chronological depictions of the metering assembly operating under the fixed position mode without the inflow stream of bulk material into the supply hopper during the continuous discharge cycle.

FIG. 13F shows a second measurement period in a series of chronological depictions of the metering assembly operating under a variable position mode during the continuous discharge cycle.

Although the specific features of the embodiments herein are shown in some drawings and not in others. This is done for convenience only as each feature may be combined with any or all of the other features in accordance with the embodiments herein.

DETAILED DESCRIPTION

The disclosure will be described more fully hereinafter with reference to the accompanying drawings, in which examples shown are not intended to be limiting.

A metering and discharge system-hereinafter referred to as a system-includes a metering assembly that forms a continuous metered stream of a bulk material such as a dry granular free-flowing product. The system discharges the continuous metered stream of the bulk material at an outflow rate that matches an inflow rate based on measurements collected within the metering assembly. The system may be used with virtually any type of bulk material (i.e., a large mass, or volume, of particulate material).

In one example, the system dispenses bulk material such as agricultural products including corn seeds, soybeans, wheat, rice, etc. The system may provide the continuous metered stream of bulk agricultural products to a downstream treatment applicator. The downstream applicator may apply a liquid treatment at a treatment flow rate that matches the outflow rate of the continuous metered stream.

Figure 1A:
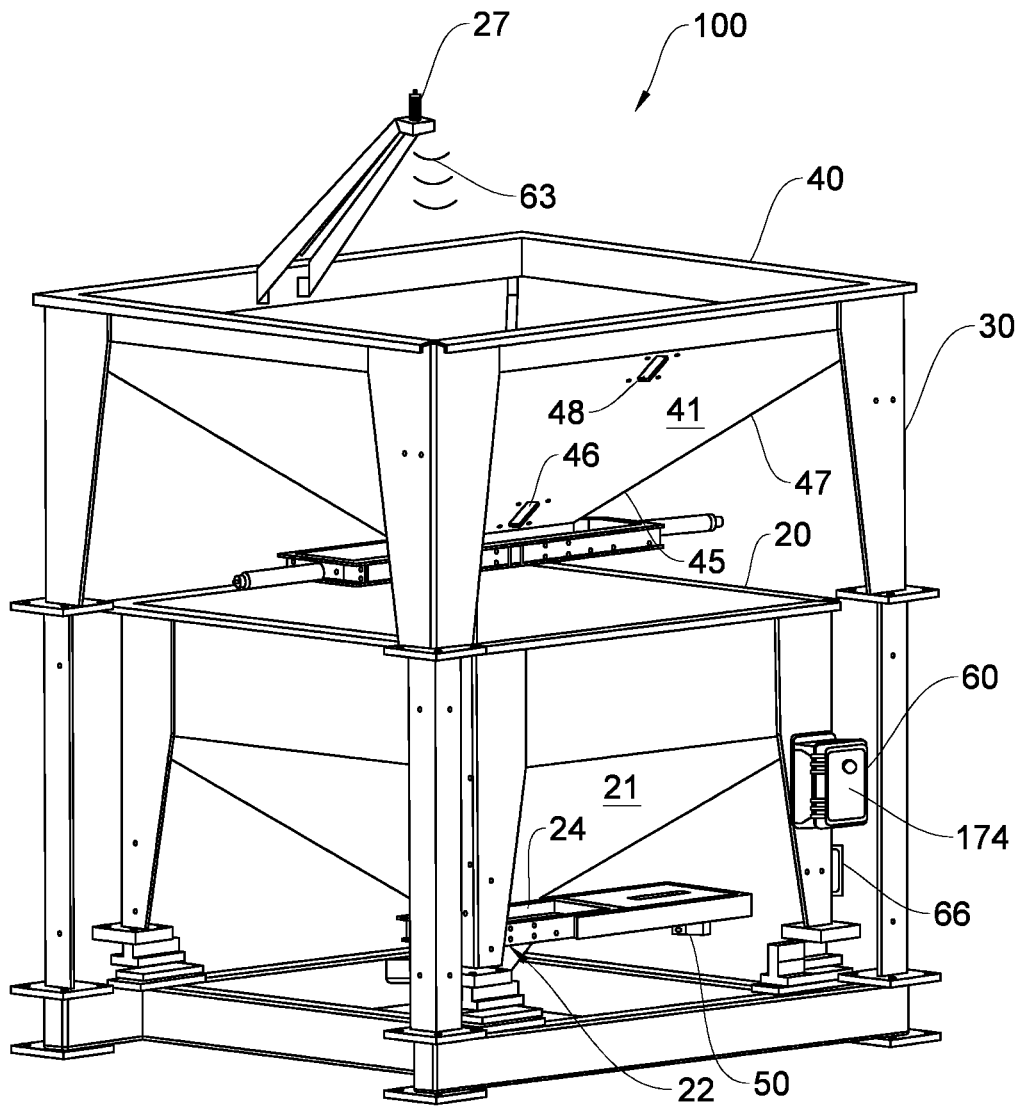
FIG. 1A shows a perspective view of an example metering and discharge system utilizing a continuous flow sensor.

As shown in FIG. 1A, system 100 can discharge the continuous metered stream through a metering assembly 30 which comprises two hoppers. The metering assembly 30 shown includes a lower hopper 20—which can be referred to as a weigh hopper—and an upper hopper 40—which can be referred to as a surge hopper. Both the lower hopper 20 and the upper hopper 40 may be made from coated or stainless-steel sheets or metallic framework. The upper hopper 40 and the lower hopper 20 may or may not be bolted to a frame assembly and/or rack to support the weight of the hoppers and the bulk material. The lower hopper 20 and the upper hopper 40 may include a lower tapered portion, that is a first tapered portion 21, and a second tapered portion 41, respectively, for directing a quantity of the bulk material. The lower hopper 20 is shown disposed below the upper hopper 40.

In one example, as shown in FIG. 1A, a plurality of proximity level sensors may be disposed along a sidewall of the upper hopper 40. The plurality of proximity level sensors disposed along the sidewall may include a first high-level proximity sensor 48 and a first low-level proximity sensor 46. The first high-level proximity sensor 48 may detect a high fill-level of bulk material present within the upper hopper 40. The first low-level proximity sensor 46 may detect a low fill-level of bulk material present within the upper hopper 40. Alternatively, an operator of a system 100, in which the system 100 is not automated, or is partially automated, may visually detect the bulk material present at the high-fill level and/or low-fill level if a first high-level window and a first low-level window are disposed in the sidewall of the upper hopper 40 in place of the proximity sensors. Fill-level windows may be made of plexiglass and bolted to apertures disposed through the sidewall of a hopper. A plurality of proximity level sensors or fill-level windows may be disposed along a sidewall of the lower hopper 20.

The fill-level sensor may be a continuous-level sensor 27, such as an ultrasonic level sensor disposed vertically above a central portion of the upper hopper 40. Alternatively, the continuous-level sensor 27 may be installed along an interior, vertical surface of the upper hopper 40. The continuous-level sensor 27 can detect fill levels of the bulk material from 0% to 100% of the hopper's holding capacity or volume. The continuous-level sensor 27 may generate a fill-level signal 63, such as a low-level signal, a high-level signal, or an intermediate-level signal. The fill-level signal 63 generated may correlate with a fill-level volume of the upper hopper 40 such as 20%, 40%, 60%, 80%, or 100% filled. Other types of sensors or detectors may be used, such as touch, optical, or pressure types.

The continuous-level sensor 27 may be used in combination with the first high-level proximity sensor 48 and the first low-level proximity sensor 46 to detect the high fill-level and the low fill-level, respectively. During operation, a fill-level sensor generates a low-level signal as the upper hopper 40, which starts empty, begins to fill with the bulk material. The upper hopper 40 is filled until the fill-level sensor generates a high-level signal. The first high-level proximity sensor 48 disposed in the upper portion 47 of the upper hopper 40 may generate a first high-level signal 208. The first low-level proximity sensor 46 disposed in the lower portion 45 of the upper hopper 40 may generate a first low-level signal 202.

Figure 1B:
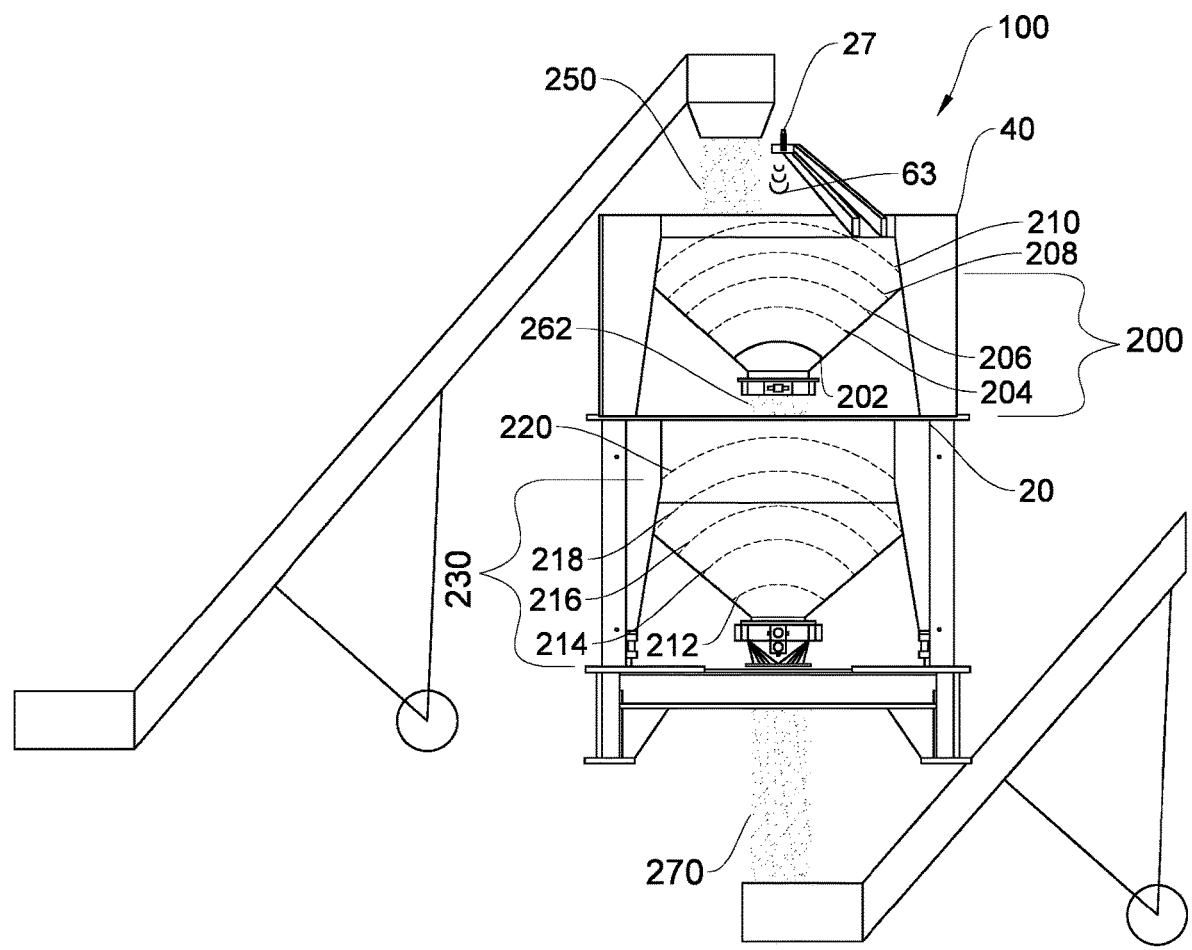
FIG. 1B shows a metering and discharge system receiving and discharging a continuous metered stream of bulk material.

The placement of the first low-level proximity sensor 46 may indicate a fill level of approximately 1% of the hopper's holding capacity or volume. The high-level placement of the first high-level proximity level sensor 48 may be up to a position that correlates with 100% of the hopper's holding capacity or volume. As shown in FIG. 1B, this may be indicated by a second high-level signal 210. As a safety measure, the first high-level proximity sensor 48 may also serve to prevent an overflow of a quantity of bulk material beyond the holding capacity or volume of the upper hopper 40. Multiple proximity level sensors may be placed between the low-level placement and high-level placement positions.

The fill-level signal 63 emitted by the fill-level sensor measures the fill-level of the bulk material within the upper hopper 40. As shown in FIG. 1B, the continuous-level sensor 27 mounted vertically above the upper hopper 40 generates the fill-level signal 63. A plurality of measured fill-level signals 200 may be received from the continuous-level sensor 27 as the flowing bulk material reaches various fill-levels of the upper hopper 40.

The fill-level sensor may provide an electronic signal, such as the plurality of measured fill-level signals 200, to a controller 60 of the system 100. The controller 60 receives the plurality of measured fill-level signals 200 from the fill-level sensor as the volume of the upper hopper 40 fills with bulk material. For example, a first low-level signal 202 may be generated by the continuous-level sensor 27 when the bulk material fills approximately 20% of the upper hopper 40. A second low-level signal 204 may be generated by the continuous-level sensor 27 when the bulk material fills approximately 40% of the upper hopper 40. An intermediate-level signal 206 may be generated by the continuous-level sensor 27 when the bulk material fills approximately 60% of the upper hopper 40. A first high-level signal 208 may be generated by the continuous-level sensor 27 when the bulk material fills approximately 80% of the upper hopper 40. The second high-level signal 210 may be generated by the continuous-level sensor 27 when the bulk material fills approximately 100% of the upper hopper 40.

The controller 60 may be an automated controller such as a programmable logic controller (PLC). The controller 60 may have a display 174 to allow operator commands. The display 174 may be a touch screen that includes a graphical user interface (GUI). Database files may be selected and edited from the display of the controller 60. System 100 may receive command signals from the controller 60 as the display 174 is activated by an operator. The controller 60 may include programming for interfacing with various load cells, scales, level sensors, and gate control mechanisms automatically. The controller 60 may be operably connected to the system 100 level sensors, load cells, scales, and gate control mechanisms by being hardwired (i.e., ethernet, data communications protocol, serial communication link) or wireless (i.e., Wi-Fi, Bluetooth, mobile, wireless networking). The controller 60 interfaces with the various system components for monitoring and controlling a discharge flow 270 of bulk material from the system 100.

Quantities of bulk material may be continuously received by the system 100 from a conveyor, hopper, bin, or other bulk material dispenser. As shown in FIG. 1B, the upper hopper 40 receives an inbound flow 250 of bulk material while the discharge flow 270 of bulk material dispenses from the lower hopper 20. The discharge flow 270 may be controlled gravimetrically at a variable rate while the inbound flow 250 enters the system 100 volumetrically.

Figure 2:
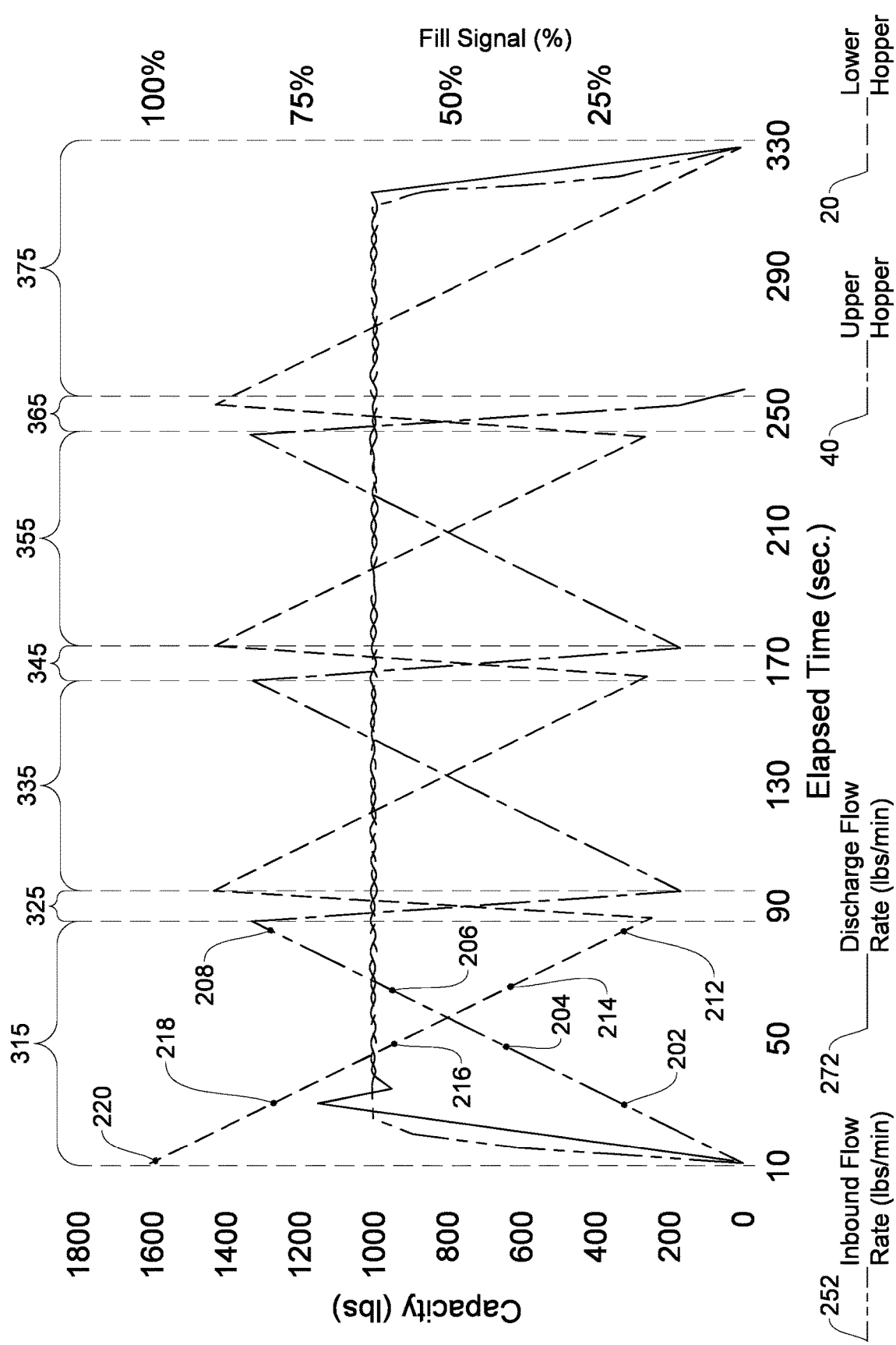
FIG. 2 shows a graphic performance estimation of a metering and discharge system conducting a continuous discharge cycle.

A graphic performance estimation of system 100 is shown in FIG. 2, where a discharge flow rate 272 closely correlates with an inbound flow rate 252 throughout multiple fill-time and release-time intervals.

The upper hopper 40, having the fill-level sensor, provides the plurality of measured fill-level signals 200 so that the controller 60 can calculate an inbound flow rate 252. In one example, the controller 60 may determine the inbound flow rate 252 for the inbound flow 250 by calculating the time between receiving the first low-level signal 202 and the first high-level signal 208. The controller 60 may associate the plurality of measured fill-level signals 200 with a digital database containing pre-determined fill-level volumes and/or weight values. The association made allows the controller 60 to establish a discharge flow rate 272 that matches the inbound flow rate 252. Correlating the discharge flow rate 272 with the inbound flow rate 252 provides accurate discharge of the continuous metered stream of bulk material.

The discharge flow rate 272 correlates with the inbound flow rate 252 as determined by the controller 60. Controller 60 determines the inbound flow rate 252 by measuring the time to fill the upper hopper 40 and calculating a fill-time value based on the measured time to fill the upper hopper 40. The controller 60 determines the measured time to fill the upper hopper 40 by monitoring the fill-level signal 63 generated by the fill-level sensor.

The discharge flow rate 272 begins to correlate with the inbound flow rate 252 in response to the fill-time value calculated by the controller 60. Real-time weight readings from the load cells supporting the lower hopper 20 may provide additional information for adjustment of the discharge flow 270.

The controller 60 can correlate readings from a timer 66, that is mounted internally or externally to the controller 60, with fill-level signal readings from the fill-level sensor to set the discharge flow rate 272 from the lower hopper 20. Timer 66 may start when the fill-level within the upper hopper 40 begins to increase, as shown at the beginning of fill-time interval 315 in FIG. 2. Timer 66 may stop when a first high-level within the upper hopper 40 is detected and a first high-level signal 208 is generated by the fill-level sensor, as shown at the end of fill-time interval 315. The fill-time value determined from receipt of the low-level signal and the high-level signal may be assessed by the controller 60 to correlate the discharge flow rate 272 with the inbound flow rate 252. In the case where system 100 is being used to discharge a continuous metered stream of seed, the controller 60 determines subsequent discharge flow rates based on the fill-time value calculated over time. Subsequent discharge flow rates may be adjusted to match changes in the inbound flow rate 252 as calculated by the controller 60 from the plurality of measured fill-level signals 200 received over time.

At the end of fill-time interval 315, the continuous-level sensor 27 signals that a quantity of bulk material has reached a first high-level signal 208 within the upper hopper 40. As an alternative, the first high-level proximity sensor 48 mounted on a sidewall of the upper hopper 40 may signal when the first high-level signal 208 has been reached. The quantity of bulk material discharges in an intermediate flow 262 from the upper hopper 40 into the lower hopper 20 during a first release-time interval 325. At the start of the first release-time interval 325, the fill-level sensor may generate the first low-level signal 202 when a minimum fill-level has been reached.

Iterative intervals of the continuous discharge cycle may follow, including a second fill-time interval 335, a second release-time interval 345, a third fill-time interval 355, a third release-time interval 365, and so on, until a delivered seed amount is discharged. A discharge period 375 ends the continuous discharge cycle as shown in FIG. 2. The discharge period 375 may occur when the inbound flow 250 of bulk material into the upper hopper 40 stops and the remaining quantity of bulk material discharges from the lower hopper 20 with the discharge flow 270 of bulk material. System 100 may turn off as soon as the delivered seed amount is discharged thereby completing the continuous discharge cycle. The system 100 may automatically turn back on as soon as the upper hopper 40 is available to refill the lower hopper 20 again.

The controller 60 converts the fill-time value corresponding to the interval between receipt of a low-level signal and a high-level signal into the inbound flow rate 252. The controller 60 calculates the inbound flow rate 252 from the fill-time value based on changes to the fill-level signal over time. The inbound flow rate 252 can be calculated as a volumetric flow rate by accessing the fill-level volume from a database file. The inbound flow rate 252 can be converted to a weight-based flow rate based on a previously calibrated relationship between volume and weight for a given material within the hopper or may be calculated based on a known or measured density of the material.

The discharge flow rate 272 from the lower hopper 20 may be synchronized with the inbound flow rate 252 into the upper hopper 40 by calibrating the system 100. The upper hopper 40 may be calibrated by an operator to determine pre-determined fill-level volumes and/or weights. The pre-determined fill-level volumes and/or weight values may be entered into the digital database along with corresponding density values based on a commodity selected and measured. Database files may contain anticipated discharge flow rates based on calculations between the pre-determined fill-level volume and density values entered in the digital database. Alternatively, the controller 60 may make the calculations in real-time as the plurality of measured fill-level signals 200 are received. The controller 60 may calculate the weight values of the bulk material within the upper hopper 40 based on the fill-level volumes sensed by the fill-level sensor.

The plurality of measured fill-level signals 200 may be associated with the weight values. The weight values associated with the plurality of measured fill-level signals 200 may be stored as entries in the database file in the digital database. The measured values of volume and weight readings may be tabulated and accessed from the database file by the controller 60 for calibration of the system 100. In one example, the controller 60 may determine the discharge flow rate 272 by accessing the database file to obtain weight values corresponding to the plurality of measured fill-level signals 200. Alternatively, the controller 60 may access the database file to obtain volume values corresponding to the plurality of measured fill-level signals 200 and a density value corresponding to the bulk material selected.

Table 1, which follows, sets forth a hypothetical database file of the system:

TABLE 1

| Fill-level Percentage (%) | Volume (Units of seeds) | Weight (lbs) | Weight (approx. kg) |
| --- | --- | --- | --- |
| 10 | 3 | 133 | 60 |
| 20 | 6 | 267 | 120 |
| 30 | 9 | 400 | 180 |
| 40 | 12 | 533 | 240 |
| 50 | 15 | 667 | 300 |
| 60 | 18 | 800 | 360 |
| 70 | 21 | 933 | 420 |
| 80 | 24 | 1066 | 480 |
| 90 | 27 | 1200 | 540 |
| 100 | 30 | 1333 | 600 |

The measured fill-level signals can be correlated with known volumes and weights of bulk material commodities such as corn and soybeans. A volume-to-weight relationship based on the bulk material commodity can be entered and established in the digital database. The controller 60 can access the database file where the association between the plurality of measured fill-level signals and corresponding weight values for each bulk material are entered. The weight may be calculated based on the fill-level volume if the density of the bulk material is known.

For example, before operating the system 100, the upper hopper 40 may be partially filled to a first fill-level, such as 20% filled, with a first portion of bulk material. A first-low-level signal 202 may be generated by the continuous-level sensor 27. The first fill-level corresponding to the first low-level signal 202 may be recorded in a database file, as shown in Table 1. The first portion of the bulk material may be dispensed from the upper hopper 40 into the lower hopper 20. The first portion of the bulk material may partially fill the lower hopper 20. In this case, the lower hopper 20 may be partially filled, that is 20% filled, by the first portion of the bulk material when hoppers of the stacked arrangement have the same capacity and dimensions. A first weight value is obtained by weighing the first portion of the bulk material within the lower hopper 20. The first weight value may be obtained from a measurement of weight made by load cells supporting the lower hopper 20. A first calibration weight signal 212 may be generated by the load cells and received by the controller 60 for calibration of the system 100. The first weight value may be recorded in the database file in response to the first calibration weight signal 212 being received by the controller 60.

The load cells may provide a plurality of measured fill-weight signals 230 to a controller 60 of the system 100. Thus, additional portions of bulk material may be weighed by the lower hopper 20 for further calibration of the system 100. A second calibration weight signal 214 may be generated and a second weight value recorded when a second portion of bulk material fills the lower hopper 20. The second weight value may be associated with the second low-level signal 204 in the database file. A third calibration weight signal 216 may be generated and a third weight value recorded when a third portion of bulk material fills the lower hopper 20. The third weight value may be associated with the intermediate-level signal 206 in the database file. A fourth calibration weight signal 218 may be generated and a fourth weight value recorded when a fourth portion of bulk material fills the lower hopper 20. The fourth weight value may be associated with the first high-level signal 208 in the database file. A fifth calibration weight signal 220 may be generated and a fifth weight value recorded when a fifth portion of bulk material fills the lower hopper 20. The fifth weight value may be associated with the second high-level signal 210 recording in the database file.

The discharge flow rate 272 may be commanded based on the weight value correlations made. Bulk material is discharged from the lower hopper 20 at the discharge flow rate 272 correlated to the inbound flow rate 252 into the upper hopper 40. The agricultural seed is discharged at the discharge flow rate 272 as a continuous metered stream of agricultural seed from the lower hopper 20. The controller 60 may command a first control mechanism 50 to position an adjustable gate 24—which can be referred to as a variable position gate—of the lower hopper 20, as shown in FIG. 1A. The first control mechanism 50 may precisely control the open/close positions of the adjustable gate 24 into commanded positions. An electric power source may be coupled to the first control mechanism 50 to provide for precise and accurate control of the adjustable gate 24. The electric power source is not shown in the figure for simplicity. A metered stream of bulk material may be continuously discharged as the discharge flow 270 through the first discharge opening 22 of the lower hopper 20 at the discharge flow rate 272. The first control mechanism 50 may command adjustment of the adjustable gate 24 in proportion to the discharge flow rate 272.

The discharge flow rate 272 may be adjusted dynamically based on the continuous fill-level change within the upper hopper 40. As a result, a continuous metered stream of bulk material may be discharged from the lower hopper 20 that corresponds to the inbound flow rate 252. Therefore, the discharge flow rate 272 from the lower hopper 20 may be adjusted to synchronize and match the inbound flow rate 252 into the upper hopper 40. Commands to the position of the adjustable gate 24 may occur in real-time as communicated by the controller 60.

During operations of system 100, as shown in FIG. 1B, the controller 60 will monitor the continuous-level sensor 27 for how fast or slow the surge level of the bulk material is increasing or decreasing within the upper hopper 40. The continuous-level sensor 27 operates to detect the fill-level from a lower portion 45 of the upper hopper 40 to an upper portion 47 of the upper hopper 40. The fill-level signal 63 generated by the continuous-level sensor 27 in response to the fill-level within the upper hopper 40 is received by the controller 60. The controller 60 adjusts the discharge flow rate 272 upon receipt of the fill-level signal 63. For example, if the surge level is increasing within the upper portion 47 of the upper hopper 40, a calculation and corresponding positive adjustment will be made by the controller 60 to automatically increase the discharge flow rate 272 upon receipt of a first high-level signal 208 generated by the continuous-level sensor 27. If the surge level is decreasing within the lower portion 45 of the upper hopper 40, a calculation and corresponding negative adjustment will be made by the controller 60 to automatically decrease the discharge flow rate 272 upon receipt of a first low-level signal 202 generated by the continuous-level sensor 27.

Synchronization between the discharge flow rate 272 from the lower hopper 20 and the inbound flow rate 252 into the upper hopper 40 may be constrained by preset target adjustment limits and minimum/maximum flow rate values. A preset target rate minimum and a preset target rate maximum can be entered and established in the digital database. The controller 60 can access the database files for the preset target adjustment limits to constrain the discharge flow rate 272 based on the flow rate values being calculated. The controller 60 may adjust the target flow rate between the preset target rate minimum and the preset target rate maximum relative to the operational constraints of a seed treatment applicator (not shown).

For example, the discharge flow rate 272 may be adjusted by up to 50 pounds per minute (lbs./min) (approximately 25 kilograms per minute (kg/min)) while the system 100 is operating. The discharge flow rate 272 may be further adjusted in smaller increments, including 25 lbs./min (approx. 11 kg/min), 20 lbs./min (approx. 9 kg/min), 10 lbs./min (approx. 5 kg/min), 5 lbs./min (approx. 2 kg/min), down to approximately 2 lbs./min (approx. 1 kg/min). The preset discharge rate minimum may be set at least to 300 lbs./min (approx. 140 kg/min). The preset discharge rate minimum may be further set below 300 lbs./min (approx. 140 kg/min), including 200 lbs./min (approx. 90 kg/min), 100 lbs./min (approx. 45 kg/min), or down to approximately 50 lbs./min (approx. 20 kg/min). The preset discharge rate maximum may be set at most to 2,000 lbs./min (approx. 900 kg/min). The preset discharge rate maximum may be further set above 2,000 lbs./min (approx. 900 kg/min), including 2,500 lbs./min (approx. 1,100 kg/min), 3,000 lbs./min (approx. 1,400 kg/min), or up to approximately 5,000 lbs./min (approx. 2,300 kg/min).

Agricultural seed may be ordered in seed amounts of between 1,000 pounds (lbs.) to 100,000 lbs. (approximately 454 kg to 45,400 kg). Ordered seed amounts may flow through the system 100 at a substantially constant rate during multiple fill-time and release-time intervals of the continuous discharge cycle. Agricultural seed in amounts of greater than 100,000 lbs. (approx. 45,400 kg) may flow through the system 100 at a substantially constant rate during an extended continuous discharge cycle having extended intervals including multiple fill-time and release-time intervals performed consecutively.

Figure 3:
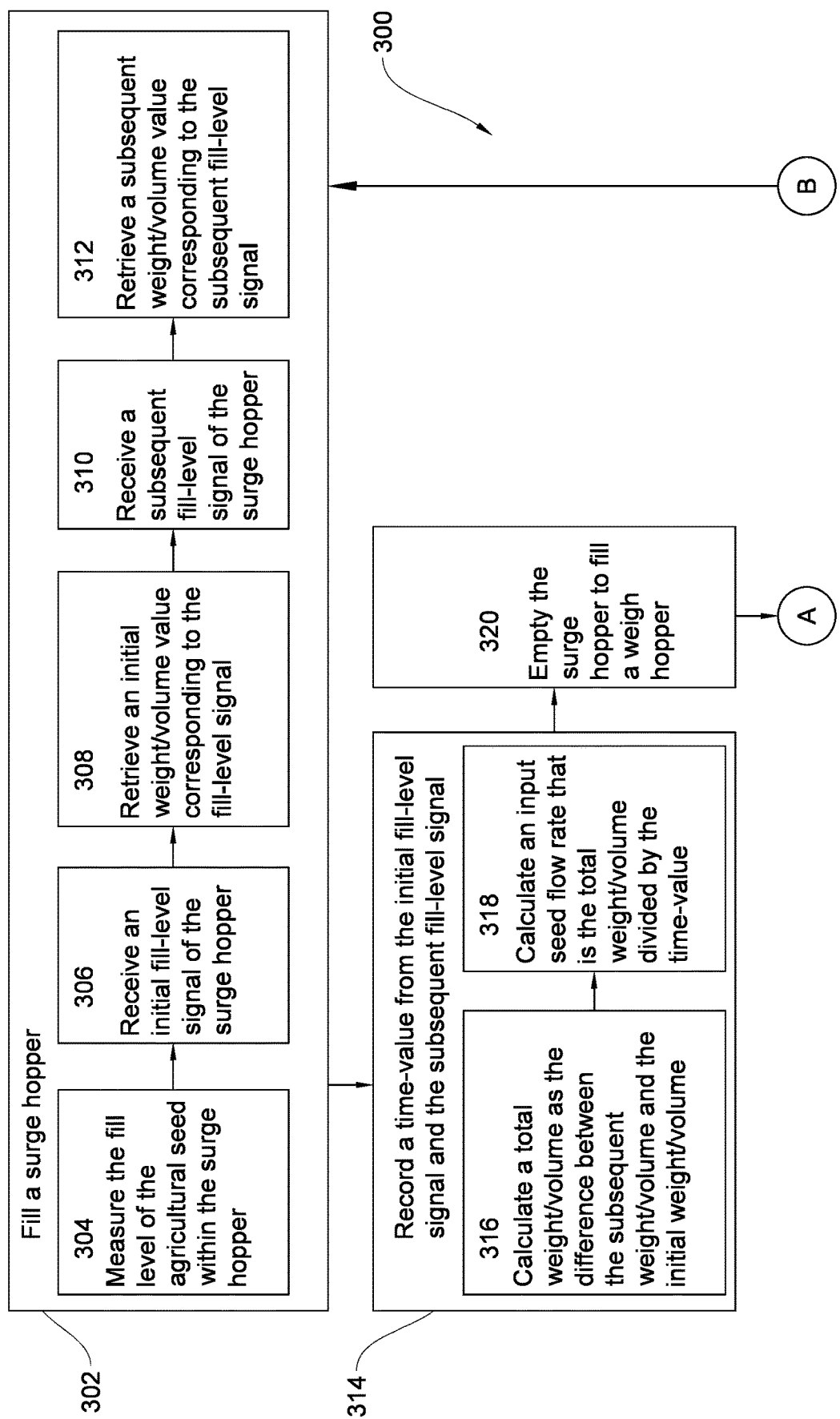
FIG. 3 depicts a flowchart for a method of discharging a continuous metered stream of agricultural seed.

A flowchart for a method 300 that comprises steps for discharging a continuous metered stream of an agricultural seed is shown in FIG. 3. An upper hopper is filled, according to step 302. Step 302 comprises the following substeps: a fill level of the agricultural seed within the upper hopper is measured with a fill-level sensor, according to step 304; an initial fill-level signal of the upper hopper is received, according to step 306; an initial weight and/or volume value corresponding to the fill-level signal of the upper hopper is retrieved, according to step 308; a subsequent fill-level signal of the upper hopper is received, according to step 310; and a subsequent weight or volume value corresponding to the subsequent fill-level signal of the upper hopper is retrieved, according to step 312. A time-value from the initial fill-level signal and the subsequent fill-level signal is recorded, according to step 314. Step 314 comprises the following substeps: a total weight and/or volume as the difference between the subsequent weight and/or volume and the initial weight and/or volume is calculated, according to step 316; and an inbound seed inflow rate that is the total weight and/or volume divided by the time value is calculated, according to step 318. The upper hopper is emptied to fill a lower hopper, according to step 320.

Discharge of a seed flow from a lower hopper disposed below the upper hopper is regulated by commanding a position of an adjustable gate, according to step 322. Step 322 comprises the following substeps: optionally, a preset discharge rate minimum and a preset discharge rate maximum are set, according to step 324, wherein the discharge seed outflow rate may be adjusted between the preset discharge rate minimum and the preset discharge rate maximum; and the discharge seed outflow rate is adjusted to match the inbound seed inflow rate that was calculated, according to step 326, wherein the discharge outflow rate may be further regulated by adjusting the position of the adjustable gate in a variable position mode based on a plurality of loss-in-weight measurements of the lower hopper measured in real-time. Step 326 comprises the following substeps: the discharge seed outflow rate is increased upon receipt of a high-level signal generated in response to the fill-level within the upper hopper, according to step 328; the discharge seed outflow rate is increased from the lower hopper by widening the gap of the adjustable gate upon receipt of the high-level signal generated by the fill-level sensor, according to step 330; the discharge seed outflow rate is decreased upon receipt of a low-level signal generated in response to the fill-level within the upper hopper, according to step 332; and the discharge seed outflow rate from the lower hopper is decreased by narrowing the gap of the adjustable gate upon receipt of the low-level signal generated by the fill-level sensor, according to step 334. The method repeats when the upper hopper fills for a second interval.

Figure 4:
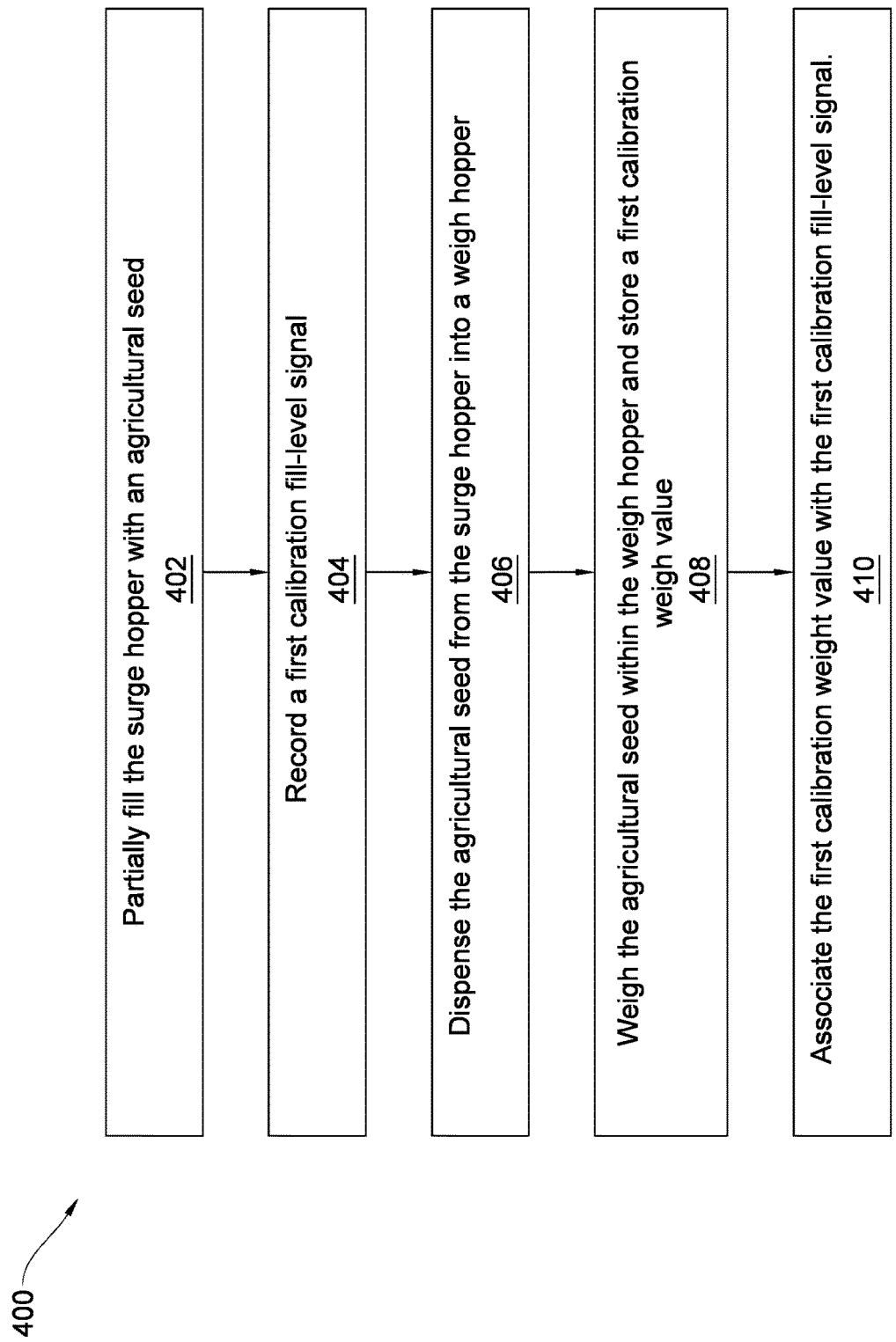
FIG. 4 depicts a flowchart for a method of calibrating a metering and discharge system.

A flowchart for a method 400 that comprises steps for calibrating a metering and discharge system is shown in FIG. 4. The upper hopper is partially filled with an agricultural seed, according to step 402. A first calibration fill-level signal is recorded, according to step 404. The agricultural seed is dispensed from the upper hopper into a lower hopper, according to step 406. The agricultural seed is weighed within the lower hopper and a first calibration weight value is stored in a digital database, according to step 408. The first calibration weight value is associated with the first calibration fill-level signal, according to step 410.

Figure 5:
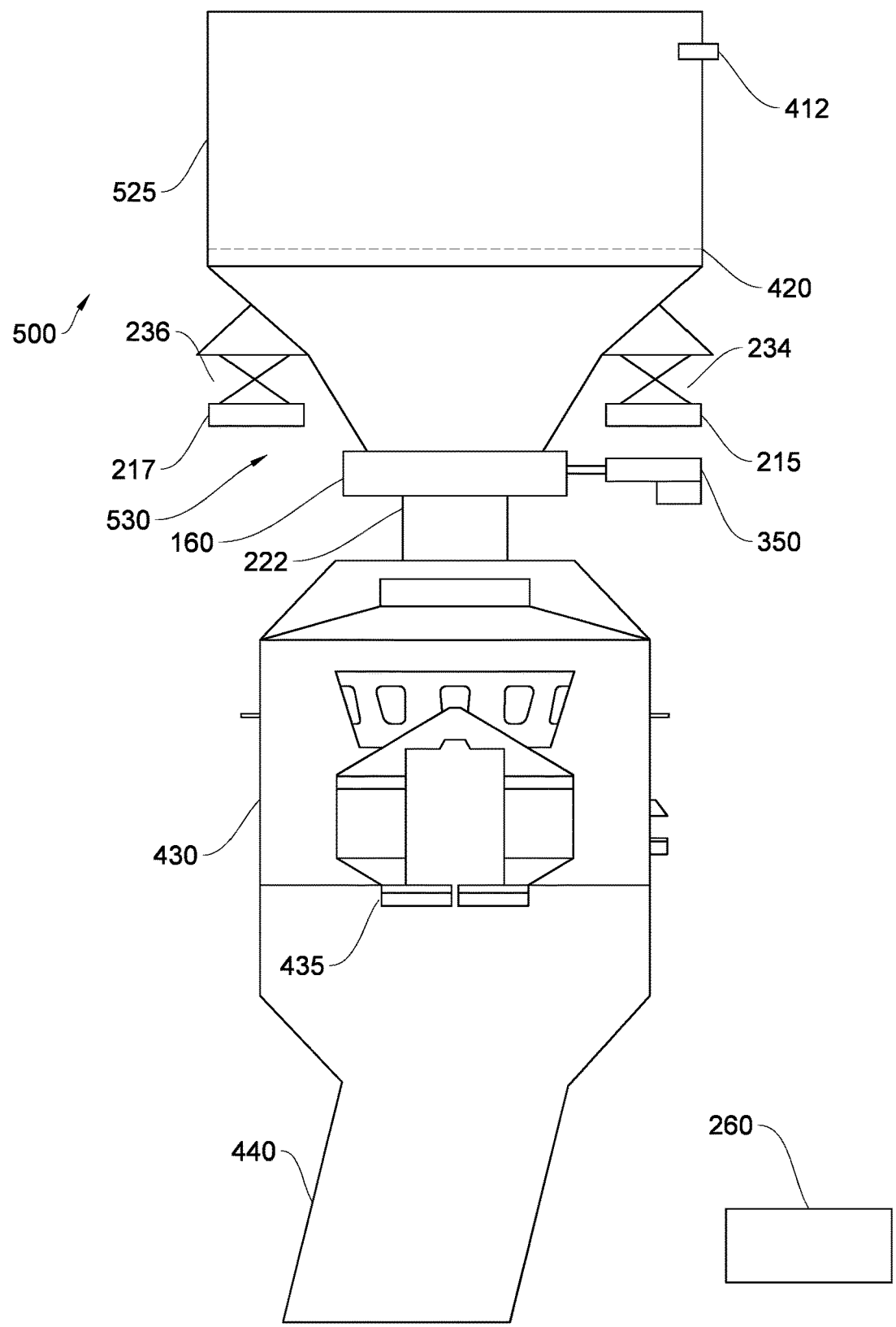
FIG. 5 shows an example of a metering and discharge system having a metering assembly without the upper hopper.

As depicted in FIG. 5, a metering assembly 530 of the system 500 may be assembled without an upper hopper 940 so that only a lower hopper 525 is utilized in the metering assembly 530. As shown, lower load cells 234, and 236 are disposed on lower load cell platforms 215, and 217, respectively, to measure the weight of the agricultural seed within the lower hopper 525. During a calibration period, the lower hopper 525 of the metering assembly 530 may be filled with a quantity of agricultural seed to a scale set point 420, which may be based on a fill-level, weight amount, or fill amount.

During the calibration period, a first weight measurement is taken by the load cells when agricultural seed fills the lower hopper 525 to the scale set point 420. A gap opening is created by adjustable gate 160 being moved into a command position by a lower control mechanism 350. The adjustable gate 160 is moved into the command position at a gate set point associated with a target gap opening percentage. A first portion of the agricultural seed in the lower hopper 525 is discharged through the gap opening for a set discharge period. The gap opening is closed by adjustable gate 160 at the end of the set discharge period. A second weight measurement of the agricultural seed within the lower hopper 525 is taken. An outflow rate is calculated by taking the difference between the first weight measurement and the second weight measurement divided by the interval of time in the set discharge period. The outflow rate is associated with the command position of the adjustable gate 160 at the gate set point. The treatment flow rate is associated with the command position of adjustable gate 160. The calibration process may have between two to twenty calibration points. In one example, between five to ten calibration points were taken. These steps may be repeated for each new command position.

As a result, a plurality of outflow rates can be associated with a plurality of command positions of the adjustable gate 160 and stored in a database made accessible to a controller 260. In addition, a plurality of treatment flow rates can be calculated by an operator in accordance with recipes based on the plurality of outflow rates, which may also be stored in the database. Each portion of agricultural seed discharged during the calibration period is applied with an accurate amount of seed treatment according to the recipe based on the outflow rate. The calibration process may be repeated when other agricultural seed sizes or types are to be treated or after a treatment cycle.

Table 2, which follows, sets forth a hypothetical calibration period of the system:

TABLE 2

| Gap Opening Percentage (%) | Discharge Period (seconds) | Quantity Discharged (pounds) | Outflow Rate (lbs./min) | Treatment Rate (lbs./min.) |
| --- | --- | --- | --- | --- |
| 10 | 15 | 10 | 40 | 0.2 |
| 20 | 15 | 20 | 80 | 0.4 |
| 40 | 15 | 40 | 160 | 0.8 |
| 60 | 15 | 60 | 240 | 1.2 |
| 80 | 15 | 80 | 320 | 2.0 |
| 100 | 15 | 100 | 400 | 2.8 |

Once the calibration period is completed, a measurement period may be started when the inflow stream of agricultural seed fills the lower hopper 525 to the scale set point 420. A high-level sensor 412 may be stationed on an upper end of the lower hopper 525 to prevent overflow of agricultural seed. The inflow stream of agricultural seed shuts down when the high-level sensor 412 generates a high-level signal to the controller 260. Controller 260 may adjust command positions of the adjustable gate 160 proportionally over the measurement period to maintain the agricultural seed in the lower hopper 525 at, or near, the scale set point 420. A level sensor, such as a proximity sensor, may be stationed at, or near, scale set point 420 to facilitate maintenance of the level of agricultural seed in the lower hopper 525 at a set fill-level.

The inflow stream of agricultural seed may continuously and sporadically enter the metering assembly 530 at a variable rate. Even so, the quantity of agricultural seed within the lower hopper 525 is maintained at, or near, the scale set point 420. The controller 260 operably connected to load cells 234, 236 monitors the quantity of agricultural seed and commands the adjustable gate 160 to maintain the quantity of agricultural seed at, or near, the scale set point 420 within the target percentage range. A real-time measurement signal generated by the load cells may cause the controller 260 to increase or decrease the gap opening of the adjustable gate 160. Therefore, adjustable gate 160 moves to maintain the quantity of agricultural seed in the lower hopper 525 at, or near, the scale set point 420.

The scale set point 420 may be set within a target percentage range of the maximum capacity of the metering assembly 530. The maximum capacity of the metering assembly 530 may be based on volume, fill level, weight, or other measuring parameter. During the measurement period, the metering assembly 530 may be filled with agricultural seed within the target percentage range. The target percentage range may be between 5% to 80% of the maximum capacity of the metering assembly 530. The target percentage range may be further between 5% to 25%, between 25% to 50%, between 50% to 80%, between 30% to 70%, between 15% to 45%, between 20% to 40%, between 40% to 70%, or between 50% to 60% of the maximum capacity of the metering assembly 530. In one example, the lower hopper 525 may hold a maximum capacity of eight units (approx. 400 lb. or 180 kg) of agricultural seed. If the target percentage of the maximum capacity is set at 50%, then the scale set point 420 may correlate with 200 lbs. (approx. 90 kg) of agricultural seed to be maintained within the lower hopper 525 by adjustable gate 160. In a preferred example, the lower hopper 525 may hold a maximum capacity of six units (approx. 300 lb. or 140 kg) of agricultural seed. If the target percentage of the maximum capacity is set at 33.3%, then the scale set point 420 may correlate with 100 lbs. (approx. 45 kg) of agricultural seed to be maintained within the lower hopper 525 by adjustable gate 160. The maximum capacity of the lower hopper 525 may be between 100 pounds to 500 pounds (approx. 45 kg to 230 kg).

The metering assembly 530 may be sized to discharge with smaller outflow rates. In such cases, the outflow rate of the agricultural seed discharged through the adjustable gate 160 may be between 25 lbs./min and 1,000 lbs./min (approx. 10 kg/min and 454 kg/min). The outflow rate of the agricultural seed discharged through the adjustable gate 160 may be further between 50 lbs./min and 800 lbs./min (approx. 20 kg/min and 360 kg/min), between 50 lbs./min and 600 lbs./min (approx. 20 kg/min and 270 kg/min), between 50 lbs./min and 400 lbs./min (approx. 20 kg/min and 180 kg/min), between 100 lbs./min and 800 lbs./min (approx. 45 kg/min and 360 kg/min), between 100 lbs./min and 600 lbs./min (approx. 45 kg/min and 270 kg/min), between 100 lbs./min and 400 lbs./min (approx. 45 kg/min and 180 kg/min), between 100 lbs./min and 300 lbs./min (approx. 45 kg/min and 140 kg/min), between 200 lbs./min and 400 lbs./min (approx. 90 kg/min and 180 kg/min), between 300 lbs./min and 500 lbs./min (approx. 140 kg/min and 230 kg/min), between 50 lbs./min and 150 lbs./min (approx. 20 kg/min and 70 kg/min), or approximately 100 lbs./min (approx. 45 kg/min).

System 500 may be used in collaboration with a treatment applicator 435. The treatment applicator 435 is shown disposed within a treatment chamber 430 positioned downstream of the metering assembly 530 in FIG. 5. A transfer chute 222 positioned downstream of the lower hopper 525 may transfer metered agricultural seed from the lower hopper 525 to the treatment chamber 430 utilized for treating. A discharge chute 440 positioned downstream of the treatment chamber 430 may transfer freshly treated agricultural seed from the treatment chamber 430 to a conveyor, drum, or other apparatus utilized for mixing and conditioning.

One such example of a treatment applicator 435 used in seed treatment is KSi's patented applicator atomizer, which is disclosed in U.S. Pat. No. 9,675,001 B2. The applicator atomizer controls the spread of liquid treatment as agricultural seed falls through the treatment chamber 430 by the force of gravity. A smaller scale version of KSi's applicator atomizer may be utilized as the treatment applicator 435 when smaller outflow rates are to be treated.

The treatment flow rate 690 may be adjusted during the operation of system 500 to treat agricultural seed discharged from the metering assembly 530 with an accurate amount of treatment. The treatment flow rate 690 may be adjusted as load cells or a level sensor, such as a continuous level sensor, indicate an increase or decrease in the weight or level, respectively, of the quantity of material within the hopper.

The load cells mounted to the metering assembly 530 may signal the controller 260 with measured weights of the agricultural seed within the metering assembly 530. A plurality of weight measurements of the metering assembly 530 may be received by the controller 260 in real-time. Based on the plurality of weight measurements, controller 260 may adjust the command position 650 of the adjustable gate 160 to regulate the agricultural seed within the metering assembly 530 at the percentage range of maximum capacity. The adjustable gate 160 may move from a first command position 652 to a second command position 654 upon generation of a measurement signal received by the controller 260. Controller 260 may adjust the treatment flow rate 690 in response to the change in the command position 650 of the adjustable gate 160. The controller 260 will increase the treatment flow rate 690 in response to an increase in the gap opening of the adjustable gate 160. Controller 260 will decrease the treatment flow rate 690 in response to a decrease in the gap opening of the adjustable gate 160. The treatment flow rate 690 may correlate with the outflow rate of the outflow stream of agricultural seed based on the command position of the adjustable gate 160.

Downstream processing may include accurately treating the outflow stream of agricultural seed with a pre-determined quantity of liquid treatment. The treatment flow rate 690 may correlate to the outflow rate in real-time as the controller 260 adjusts the adjustable gate 160 during the operation of system 500. The treatment flow rate 690 may be pre-determined to correlate with command positions of adjustable gate 160 that are based on outflow rates calculated during the calibration period. Liquid treatment(s) may be accurately applied at treatment flow rates that correlate to commanded gate positions made in response to real-time measurement signals made by load cells that are received by the controller 260. The liquid treatment may be applied to the agricultural seed while discharged from the metering assembly 530 in accordance with a pre-determined recipe based on the outflow rate.

System 500 may be used in collaboration with a control software platform or program that serves as a measuring and control device for the treatment applicator 435 positioned downstream of the system 500. One such example used in seed treatment is KSi® AutoTreat®. The control software platform controls the treatment flow rate 690 of the auto treater based on a recipe input (i.e., oz./per 100 lbs. of seed (or mL/kg)) and the outflow rate measured from the system 500. As a measuring and control device, the control software platform may control the adjustable gate 160 concurrently with the speed of the seed treatment pumps to match an outflow rate. Controller 260 may be installed with the program to have multi-functionality capabilities to receive measured outflow rates and calibrate seed treatment parameters based on the predetermined recipes from the operator.

Figure 6:
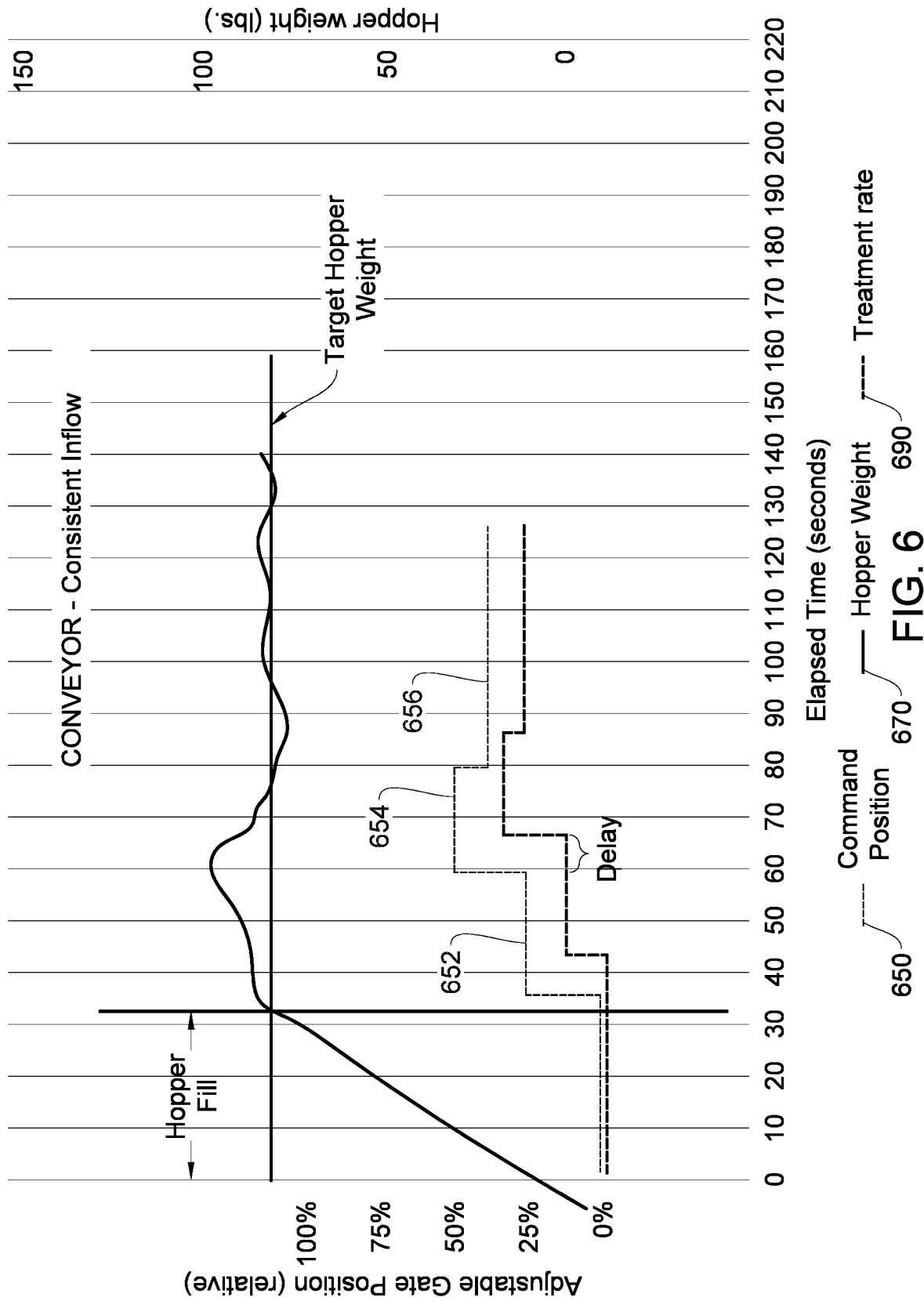
FIG. 6 shows a graphic performance estimation of a metering and discharge system with consistent inflow.

FIG. 6 shows a graphic performance estimation of system 500 under operation. The lower hopper 525 of system 500 receives an inflow stream of bulk material, such as agricultural seed, at an inflow rate that is substantially consistent. For example, a conveyor may be dispensing a continuous stream of agricultural seed into an inlet side of the lower hopper 525. The continuous stream may have consistent inflow. The continuous stream may have a variable rate. An adjustable gate 160 of the lower hopper 525 may remain closed for a hopper fill period until a hopper weight 670 that matches a target hopper weight is measured. Then, as shown in FIG. 6, adjustable gate 160 opens to a first command position 652 that allows the discharge of an outflow stream of agricultural seed from the lower hopper 525 at an outflow rate that begins to correspond with the inflow rate. The relative position of adjustable gate 160 in the first command position 652 correlates with a gap opening percentage of approximately 25%. If the hopper weight 670 measurement increases above the target hopper weight, the adjustable gate 160 opens to a second command position 654 so that the outflow rate corresponds with the inflow rate. The relative position of adjustable gate 160 in the second command position 654 correlates with a gap opening percentage of approximately 50%. If the hopper weight 670 measurement decreases below the target hopper weight, the adjustable gate 160 closes to a third command position 656 so that the outflow rate corresponds with the inflow rate. The relative position of adjustable gate 160 in the third command position 656 correlates with a gap opening percentage of approximately 35%. Adjustment of the gap opening percentage by adjustable gate 160 maintains the hopper weight 670 at, or near, the target hopper weight. The treatment flow rate 690 for a liquid treatment applied to the agricultural seed by a treatment applicator may be adjusted based on the relative position of the adjustable gate 160. Adjustment to the treatment flow rate 690 may be instantaneous with a change in the gap opening percentage of the adjustable gate 160. Alternatively, adjustment of the treatment flow rate 690 may be delayed based on an interval of time for the outflow stream of agricultural seed to reach the treatment applicator.

Figure 7:
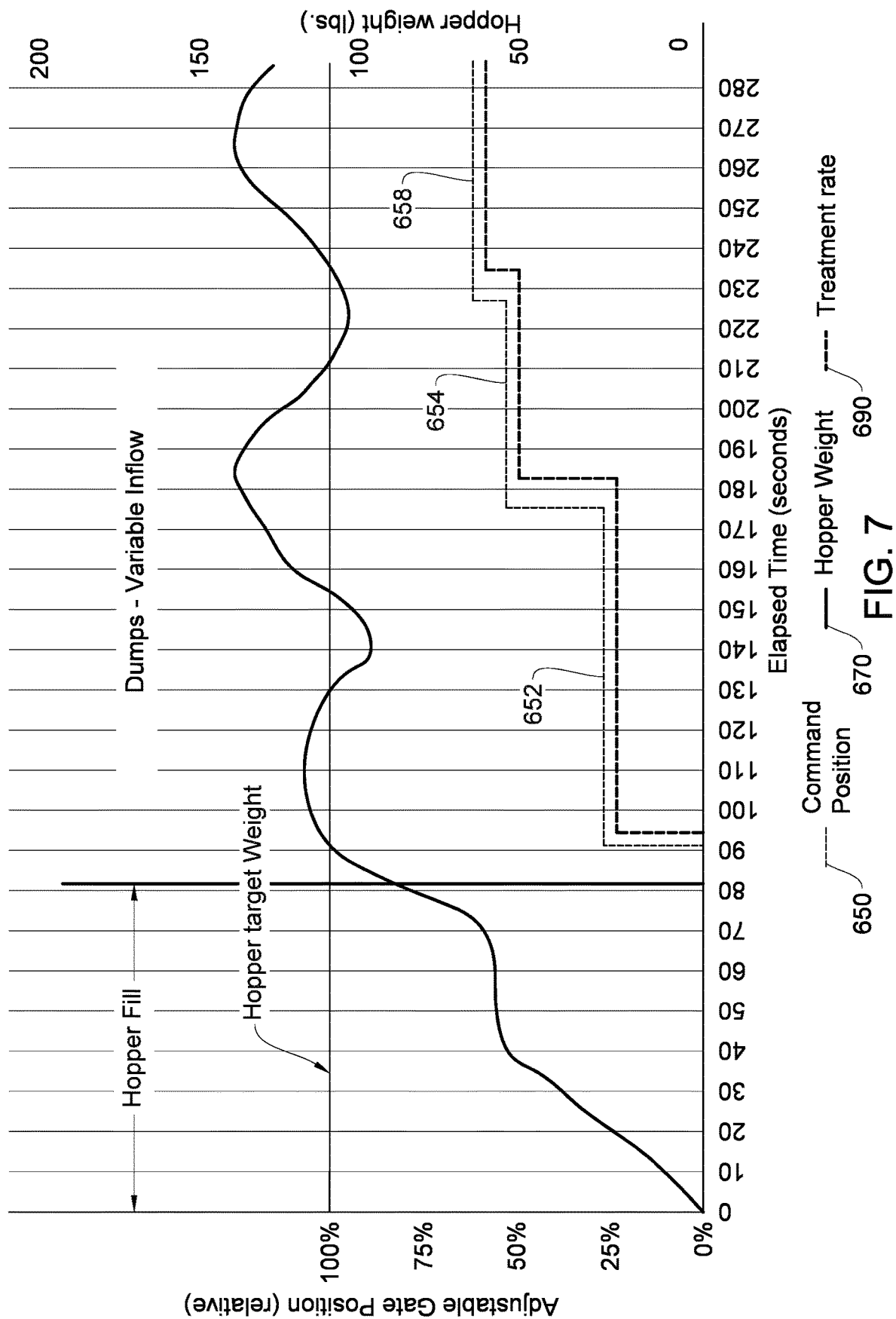
FIG. 7 shows a graphic performance estimation of a metering and discharge system with inconsistent inflow.

FIG. 7 shows a graphic performance estimation of system 500 under operation. The lower hopper 525 of system 500 receives an inflow stream of bulk material, such as agricultural seed, at an inflow rate that is inconsistent. The inflow stream of bulk material may be a discontinuous stream. For example, a loader may be dispensing loads of agricultural seed into an inlet side of the lower hopper 525. The loads may be dispensed as dumps at irregular intervals. An adjustable gate 160 of the lower hopper 525 may remain closed for a hopper fill period until a hopper weight 670 that matches the target hopper weight is measured. Then, as shown in FIG. 7, adjustable gate 160 opens to a first command position 652 that allows the discharge of an outflow stream of agricultural seed from the lower hopper 525 at an outflow rate that begins to correspond with the inflow rate.

The relative position of adjustable gate 160 in the first command position 652 correlates with a gap opening percentage of approximately 25%. If the hopper weight 670 measurement increases above the target hopper weight, the adjustable gate 160 opens to a second command position 654 so that the outflow rate corresponds with the inflow rate. The relative position of adjustable gate 160 in the second command position 654 correlates with a gap opening percentage of approximately 50%. If the hopper weight 670 measurement increases substantially above the target hopper weight for a second period, the adjustable gate 160 opens further to a third command position 658 so that the outflow rate corresponds with the inflow rate. The relative position of adjustable gate 160 in third command position 658 correlates with a gap opening percentage of approximately 60%. Adjustment of the gap opening percentage by adjustable gate 160 maintains the hopper weight 670 at, or near, the target hopper weight.

The treatment flow rate 690 for a liquid treatment applied to the agricultural seed by a treatment applicator may be adjusted based on the relative position of the adjustable gate 160. Adjustment to the treatment flow rate 690 may be instantaneous with a change in the gap opening percentage of the adjustable gate 160. Alternatively, adjustment of the treatment flow rate 690 may be delayed based on an interval of time for the outflow stream of agricultural seed to reach the treatment applicator.

Figure 8:
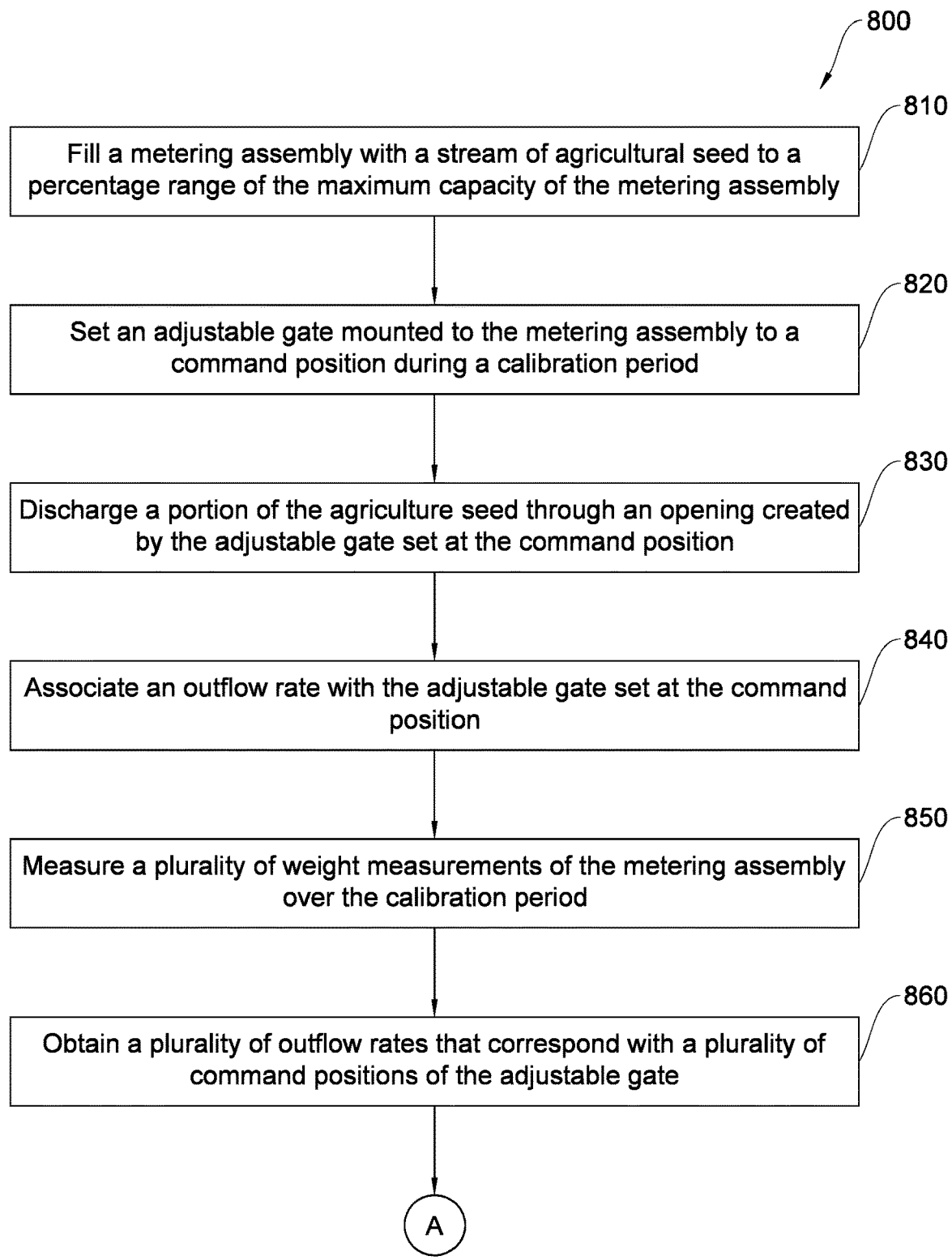
FIG. 8 shows an example flowchart of an automated method for calibrating a metering assembly to discharge agricultural seed at an outflow rate that matches the inflow rate.

FIG. 8 is an example flowchart of an automated method 800 for calibrating the metering assembly to discharge agricultural seed at an outflow rate that matches the inflow rate. At step 810, an inflow stream of agricultural seed fills a metering assembly to a percentage range of the maximum capacity of the metering assembly. At step 820, the controller sets an adjustable gate mounted to the metering assembly to a command position. At step 830, the metering assembly discharges a portion of the agricultural seed through an opening created by the adjustable gate set at the command position. At step 840, the controller associates an outflow rate with the adjustable gate set at the command position. At step 850, load cells measure a plurality of weights of the metering assembly. At step 860, the controller obtains a plurality of outflow rates that correspond with a plurality of command positions of the adjustable gate. At step 870, the metering assembly determines an inflow rate of the stream of agricultural seed based on the plurality of weight measurements. At step 880, the controller regulates the command position of the adjustable gate, optionally in real-time, to maintain the agricultural seed within the metering assembly at the percentage range of the maximum capacity. At step 890, the controller adjusts a treatment rate in response to an increase or decrease in an opening of the adjustable gate. A treatment recipe may be based on the outflow rate according to the command position of the adjustable gate.

Figure 9:
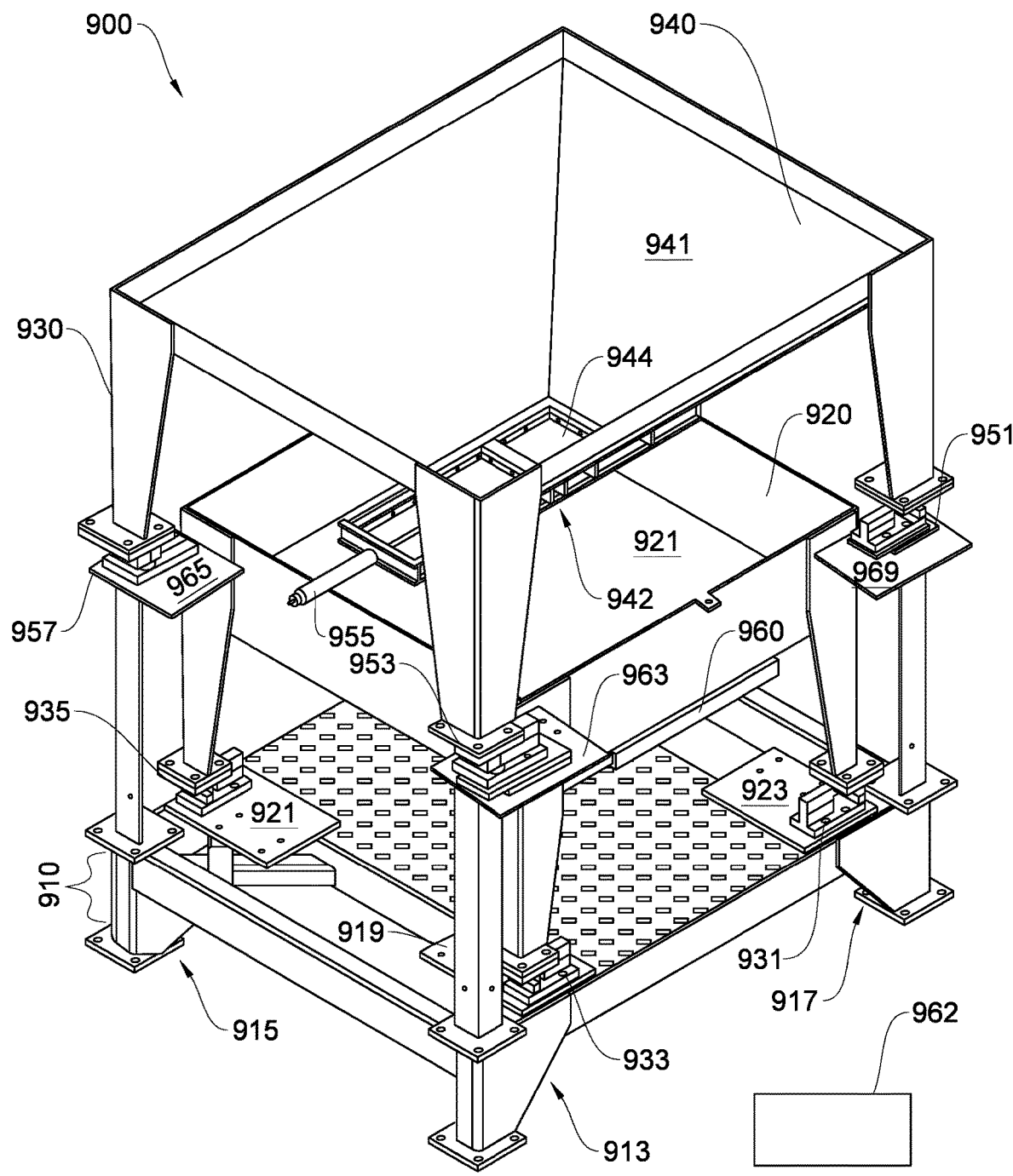
FIG. 9 shows an example of a metering assembly with an upper hopper and a lower hopper.

An example of a metering assembly 930 is presented in FIG. 9. The metering assembly 930 has a mechanical sub-assembly made from coated or stainless-steel sheets or metallic framework. The metering assembly 930 may include at least two hoppers, an upper hopper 940 and a lower hopper 920, respectively. The upper hopper 940 and the lower hopper 920 may or may not be bolted to a frame assembly and/or rack to support the added weight of the agricultural seed. The upper hopper 940 is disposed above the lower hopper 920.

Each of the hoppers may be configured to support up to 10,000 lbs. (approx. 4,540 kg), or more, of weight. In the example shown, each hopper is configured to support between 1,500 lbs. to 2,000 lbs. (approx. 680 kg to 907 kg) of weight. The holding capacity of the upper hopper 940 may equal that of the lower hopper 920. Alternatively, the holding capacity of the upper hopper 940 may be greater than or less than that of the lower hopper 920.

Legs of the upper hopper 940 and lower hopper 920 are each disposed upon vertical support members 913, 915, and 917. Vertical support members 913, 915, and 917 may be connected to the foundation of a lower sub-frame 910. A load cell may be attached to the lower ends of each of the legs to support the upper hopper 940 and lower hopper 920. The load cell may be selected from several common types such as electronic, strain gauge, hydraulic, electropneumatic, or hydraulic pneumatic.

Readings by the load cell may be given in English (or metric) increments of a half-pound (approx. 0.25 kg), one pound (approx. 0.5 kg), 2 lbs. (approx. 1 kg), 5 lbs. (approx. 2.5 kg), 10 lbs. (approx. 5 kg), 20 lbs. (approx. 10 kg), 100 lbs. (approx. 50 kg), depending on the quality of adjustment for operation and calibration of the system 100. The load cell may have a capacity to read up to 2,500 lbs. (approx. 1,134 kg), or more, of weight. In that case, a total capacity of up to 10,000 lbs. (approx. 4,540 kg) of weight may be read by four load cells used in combination together with an associated hopper.

The load cell may transmit a wireless data input signal via a transmitter or be electrically connected directly to a controller 962. Controller 962 may have a network connection with system 900. The load cell may provide a change-in-weight reading, which may be a loss-in-weight reading or a gain-in-weight reading, of the associated hopper to the controller 962 as the quantity of seed within the hopper changes. The controller 962 may further measure the rate of weight change of the associated hopper. The load cell may be electrically or wirelessly connected to a load scale. Alternatively, the load cell may coordinate readings with a legal for the trade scale or beam scale.

The controller may be operably connected to system 900. An operator may be given mastery over the system 900 with a built-in programmable automation controller that is hard-wired (i.e., ethernet, data communications protocol, serial communication link) or wireless (i.e., Wi-Fi, Bluetooth, mobile, wireless networking). The controller may include a central processing unit with programming for interfacing with load cells, scales, level sensors, gate position sensors, and control mechanisms for monitoring and controlling the flow of seed from the hoppers and seed treatment from the seed treatment pumps. The controller may have a touch screen to allow for operator commands. Various data input signals may be sent to the controller from the plurality of load cells. Various command output signals may be sent from the controller based on the data received. In a hard-wired system, the load cells may be electrically linked to the controller through a plurality of cables.

As shown in FIG. 9, both the upper hopper 940 and the lower hopper 920 may be supported directly with a plurality of load cells. Lower hopper 920 is mounted with lower load cells 931, 933, and 935, and upper hopper 940 is mounted with upper load cells 951, 953, and 957. The number of load cells utilized may depend on the shape of the hoppers, whether round, triangular, square, or rectangular. The first lower load cell 931 is mounted to the lower hopper 920 at a lower end between a first leg of the lower hopper 920 and a lower load cell platform. The weight of the lower hopper 920 and a quantity of agricultural seed within, pushes against the first lower load cell 931 by the force of gravity. Alternatively, the first lower load cell 931 may be mounted above the top side of the lower hopper 920. In this case, the weight of the lower hopper 920 and a quantity of agricultural seed within, pulls against the first lower load cell 931 by the force of gravity. The first upper load cell 951 is mounted to the upper hopper 940 at a lower end between a first leg of the upper hopper 940 and an upper load cell platform. The weight of the upper hopper 940 and a quantity of agricultural seed within, pushes against the first upper load cell 951 by the force of gravity. Alternatively, the first upper load cell 951 may be mounted above the top side of the upper hopper 940. In this case, the weight of the upper hopper 940 and a quantity of agricultural seed within, pulls against the first upper load cell 951 by the force of gravity.

Load cells may be mounted to the upper hopper 940 and lower hopper 920 upon load cell platforms mounted generally above vertical support members 913, 915, and 917. Lower load cell platforms 919, 922, and 923 may be disposed upon and supported by the lower sub-frame 910 which also provides support for the lower hopper 920. Upper load cell platforms 963, 965, and 969 may be disposed upon and supported by the lower sub-frame 910 which also provides support for the upper hopper 940. The lower sub-frame 910 disposed below each of the hoppers may be mounted to and supported by a plurality of support members, which may include the vertical support members 913, 915, and 917. The vertical support members 913, 915, and 917 may be connected to the support rack or supportive framework of the lower sub-frame 910. Alternatively, each of the hoppers may be supported vertically, from above, by the plurality of support members, which may include chains or rods.

A first tapered portion 921 of the lower hopper 920 and a second tapered portion 941 of the upper hopper 940 may be sufficiently steep and smooth to reduce friction and direct a quantity of the bulk material for discharge. In the case of using a round hopper, less friction may reduce instances where seed flow forms a central flow path (funnel flow) within the hopper while non-flowing seed is left along the inside margins within the hopper. An upper discharge opening 942 of the metering assembly 930 is positioned in the bottom of the second tapered portion 941 of the upper hopper 940. A lower discharge opening (not shown) of the metering assembly 930 is positioned at the bottom of the first tapered portion 921 of the lower hopper 920. A binary gate 944 may be mounted against the upper hopper 940 at the upper discharge opening 942. The adjustable gate 960 may be mounted against the lower hopper 920 at the lower discharge opening.

Metering assembly 930 is operable to intermittently dispense a seed amount from the upper hopper 940 into the lower hopper 920, while the lower hopper 920 continuously delivers seed at an outflow rate 1080 for downstream processing. The inflow stream of agricultural seed is received into the upper hopper 940 of the metering assembly 930. System 900 monitors the upper hopper 940 for when a quantity of seed reaches a predetermined target weight. An upper control mechanism 955 may be operably connected to the binary gate 944 of the upper hopper 940. Dual gates of binary gate 944 may be opened by means of activating the upper control mechanism 955. The upper control mechanism 955 may be powered by a pneumatic pressure source to provide for simultaneous, independent control of each of the gates of the binary gate 944, although the pneumatic pressure source is not shown in the figures for simplicity. The upper control mechanism 955 may be a pair of air-assisted cylinders operably connected to dual gates of binary gate 944. The upper control mechanism 955 provides regulated air to first and second pneumatic air-assist cylinders for quick and accurate control of the open and closed positions of the binary gate 944. The upper control mechanism 955 may quickly open and close the binary gate 944 based on commands received from the controller 962.

Binary gate 944 opens to discharge a surge of agricultural seed from the upper hopper 940 into the lower hopper 920 of the metering assembly 930 when the lower hopper 920 is running low on a quantity of seed. The binary gate 944 may be opened quickly periodically for quicker refill periods of the lower hopper 920. The binary gate 944 may be closed quickly and periodically for longer measurement periods of the lower hopper 920. The adjustable gate 960 may be continuously adjusted while the binary gate 944 is closed.

Both the upper hopper 940 and the lower hopper 920 of the metering assembly 930 are measured continuously in real-time as the agricultural seed is discharged gravimetrically. Loss-in-weight measurement signals may be generated by the load cells mounted to the upper hopper 940 and the lower hopper 920. The loss-in-weight measurement signals may be received by controller 962 in real-time as the agricultural seed is discharged gravimetrically. Controller 962 may decrease an opening created by the adjustable gate 960 upon a loss-in-weight of the upper hopper 940 over a measurement period. Controller 962 may increase the opening created by the adjustable gate 960 upon a gain-in-weight of the upper hopper 940 over a measurement period.

A program of system 900 may calculate set points based on hopper weights and start/stop commands for each of the hopper gates involved in the seed metering and discharge operation. More specifically, set points may be established on timer settings based on calculated intervals of time, weight measurements obtained from the upper hopper 940 and/or the lower hopper 920, high/low weight readings from load cells, indications by high/low-level sensors (proximity) having a fixed position within the hoppers, or another predetermined parameter. The bulk density of the agricultural seed may be used to calibrate the set points based on weight. An operator may adjust established set points such as weight limits, command positions of the adjustable gate 960, or time intervals stored in the controller 962 as needed.

Set points may be determined based on a plurality of measurements of agricultural seed within the metering assembly 930. A set point for a command position of adjustable gate 960 may be determined while the binary gate 944 is closed. In one example, the set point is based on the measurement of agricultural seed within the lower hopper 920 during a measurement period. In another example, the set point is based on the measurement of agricultural seed within the upper hopper 940 during the measurement period. The refill period may be triggered by controller 962 once a refill set point has been met. The refill set point may correlate to a high-weight set point being reached, as indicated by load cells of the upper hopper 940. The refill set point may correlate to a low-weight set point being reached, as indicated by load cells of the lower hopper 920.

The refill set point may correlate to a timer set point being reached, as indicated by a timer of the system 900. The timer set point may be based on a refill period of between 0.1 seconds and 10 minutes. The refill period may be further between 1 second and 5 minutes, between 1 minute and 5 minutes, between 2 minutes and 8 minutes, between 5 minutes and 10 minutes, or between 30 seconds and 5 minutes.

The refill period may be allowed to continue even after the lower hopper 920 has been refilled. Agricultural seed filling the lower hopper 920 may begin to choke feed through the binary gate 944 that remains opened and backfill into the upper hopper 940. A set surge fill level in the upper hopper 940 may be maintained and monitored during the refill period. The command position of adjustable gate 960 may be set in a fixed position when the binary gate 944 is opened. The command position of adjustable gate 960 may be maintained at the set point during the refill period of the lower hopper 920. The command position of adjustable gate 960 may be maintained at the set point during the refill period of both the lower hopper 920 and the upper hopper 940 of the metering assembly 930.

Controller 962 may adjust the command positions of the adjustable gate 960 proportionally over the measurement period. During the refill period, controller 962 may fix the command position of the adjustable gate 960 at a set point that was calculated during a previous measurement period. During a subsequent measurement period, controller 962 may trigger an adjustment to the outflow rate 1080 controlled by the adjustable gate 960. Adjustment to the outflow rate 1080 may be based on monitoring of the upper hopper 940 for variable accumulations or depletions in the inflow rate 1070 during the refill period. Advantages to monitoring the upper hopper 940 having load cells include less likelihood in the system 900 running out of seed during processing and more accuracy in matching the outflow rate 1080 to the inflow rate 1070.

The transition time between adjusting and fixing the command positions of adjustable gate 960 may occur over a period of a few seconds. Alternatively, time-off and time-on delays may be programmed into controller 962 to establish a transition phase between modes. This may allow the loss-in-weight readings by the load cells to "catch up" since readings for differences in weight may be taken sequentially, such as ten times each second. Calculations based on an average of the last ten seconds logged by the load cells may allow for transition to occur over an interval of time between three to five seconds.

The command position may be maintained at the set point until a load cell mounted to the lower hopper 920 reports a loss-in-weight over the refill period. The refill period may occur over an interval of time lasting between 0.1 second to 30 seconds in length. The interval of time over the refill period may be further between 1 second to 20 seconds, between 2.5 seconds to 15 seconds, between 5 seconds to 10 seconds, between 5 seconds to 25 seconds, between 10 seconds to 20 seconds, or between 5 seconds to 15 seconds. The measurement period may occur over an interval of time lasting between 30 seconds to 10 minutes in length. The interval of time over the measurement period may be further between 30 seconds to 8 minutes, between 40 seconds to 6 minutes, between 50 seconds to 4 minutes, between 1 minute to 3 minutes, or between 1 minute and 2 minutes.

The upper control mechanism 955 and lower control mechanism (not shown) may be electrically, mechanically, hydraulically, or pneumatically powered. Gate operation may be actuated by devices such as cylinders, servomechanisms, or worm screws. Pneumatic air-assist cylinders and electric actuators, having position control, may be selected to operate the hopper gates because of their rapid precision control. Control of the hopper gates may be provided by other means than pneumatic cylinders or electric actuators. The upper control mechanism 955 and lower control mechanism may be coupled with a controller to receive various control inputs.

The controller may be an automated controller such as a computer serving as a programmable logic controller (PLC) that automatically controls the functions of the system 900. The controller may be an automated controller such as a proportional integral derivative (PID) loop controller that automatically controls the functions of system 900. The controller may be operably connected to the upper control mechanism 955, the lower control mechanism, and load cells 931, 933, 935, 951, 953, and 957. Controller 962 may receive multiple mass measurement input signals from load cells 931, 933, 935, 951, 953, and 957. The controller 962 may be programmed to send command output signals to activate and operate the upper control mechanism 955 and the lower control mechanism. The controller 962 is also responsive to position feedback input signals received from the upper control mechanism 955 and the lower control mechanism. A transmitter operably connected to the upper control mechanism 955 and the lower control mechanism may transmit the position feedback input signals to the controller.

Agricultural seed may be processed in seed amounts of between 1,000 pounds (lbs.) to 50,000 lbs. (approximately 454 kilograms (kg) to 22,680 kg). Agricultural seed may flow through system 900 at a substantially constant rate during a continuous discharge cycle. Agricultural seed in amounts greater than 50,000 lbs. (approx. 22,680 kg) may flow through the system 900 at a substantially constant rate during an extended continuous discharge cycle or throughout an extended interval that includes multiple continuous discharge cycles performed consecutively.

Figure 10:
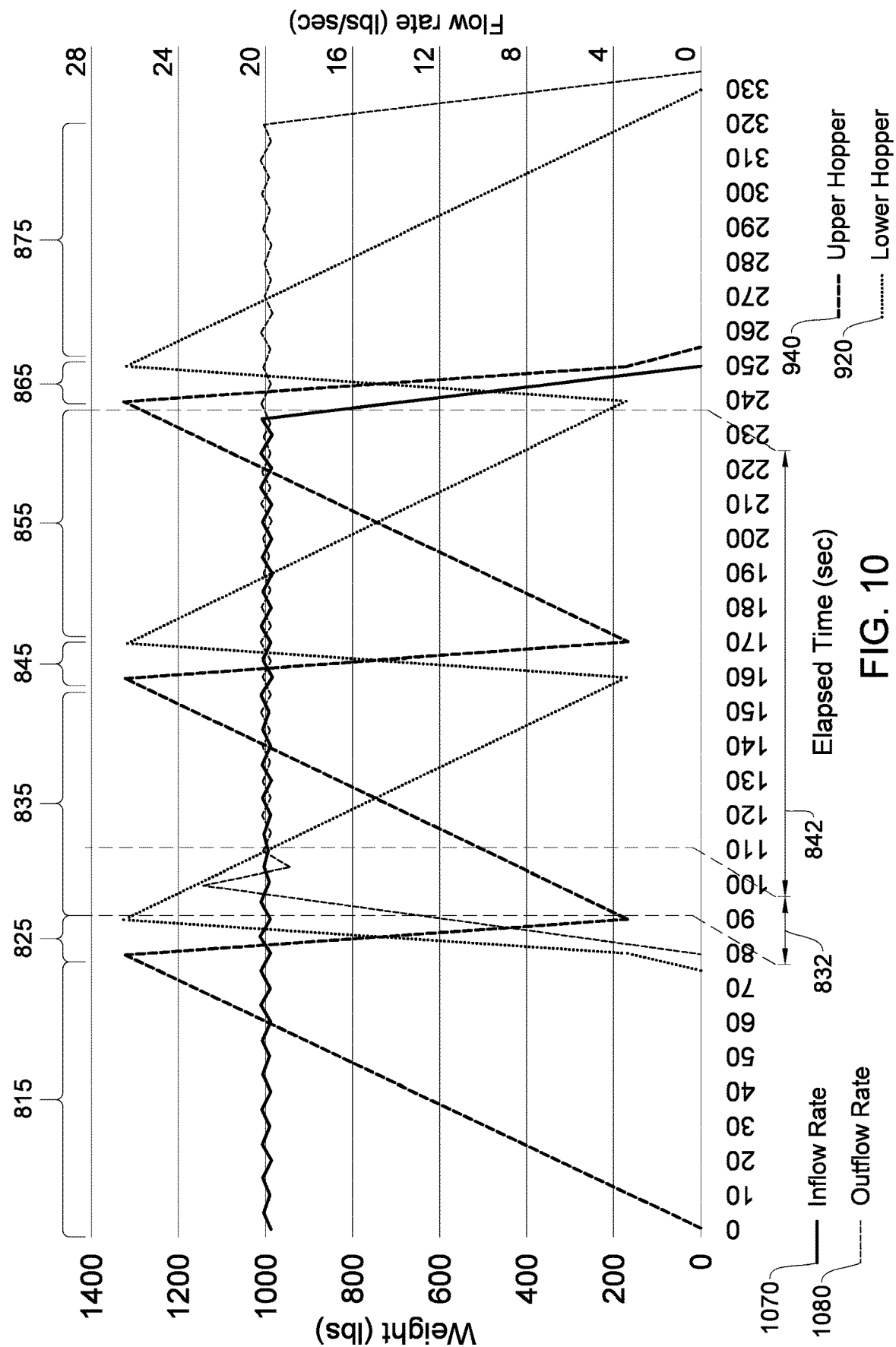
FIG. 10 shows a graphic performance estimation of a seed metering and discharge system.

FIG. 10 shows a graphic performance estimation of system 900 in operation during a continuous discharge cycle. The upper hopper 940 is filled with a first quantity of bulk material during a loading period 815. During the loading period 815, the inflow rate 1070 may be determined based on a plurality of weight measurements of agricultural seed within the upper hopper 940. Once filled, the upper hopper 940 discharges the first quantity of bulk material to the lower hopper 920 during a first refill period 825 to form a second quantity of bulk material.

At the start of the first refill period 825, the fixed position mode may be activated when a first low-level sensor of the lower hopper 920 signals that the second quantity of bulk material has reached a low-level within the lower hopper 920. If the fixed position mode is activated, the lower control mechanism moves the adjustable gate into a fixed position. The upper hopper 940 may have a second high-level sensor that signals the program to initiate the fixed position mode. As one alternative, load cells 931, 933, and 935 supporting the lower hopper 920 may signal that a first low-weight set point has been reached so that the program initiates the fixed position mode. As another alternative, load cells 951, 953, and 957 supporting 11 the upper hopper 940 may signal that a second high-weight set point has been reached so that the program initiates the fixed position mode.

At the end of the first refill period 825, the upper control mechanism 955 closes the binary gate 944 of the upper hopper 940, and the upper hopper 940 begins to fill with a third quantity of bulk material. Over a matching phase 832 of the first measurement period 835, the outflow rate 1080 of the agricultural seed discharged from the lower hopper 920 begins to correlate with the inflow rate 1070 as the lower control mechanism proportionately adjusts the adjustable gate based on real-time readings from load cells 931, 933, 935 supporting the lower hopper 920.

During the first measurement period 835, the inflow rate 1070 may be determined based on a plurality of weight measurements of agricultural seed within the lower hopper 920. The inflow rate 1070 continues to be monitored over a monitoring phase 842 of the continuous discharge cycle by load cells 931, 933, 935, and 951, 953, 957 supporting the lower hopper 920 and upper hopper 940, respectively, so the outflow rate 1080 matches the inflow rate 1070 by control and adjustment of the adjustable gate 960.

Iterative periods of the continuous discharge cycle may follow, including a second refill period 845, a second measurement period 855, a third refill period 865, and so on, until a delivered seed amount is discharged. A discharge period 875 ends the continuous discharge cycle as shown in FIG. 10. The discharge period 875 may occur when the inflow stream of bulk material into the upper hopper 940 stops and the output flow of bulk material discharges the remaining quantity of bulk material from the lower hopper 920. System 900 may turn off as soon as a delivered seed amount is discharged thereby completing the continuous discharge cycle. System 900 may automatically turn back on as soon as the upper hopper 940 is available to refill the lower hopper 920 again.

Figure 11:
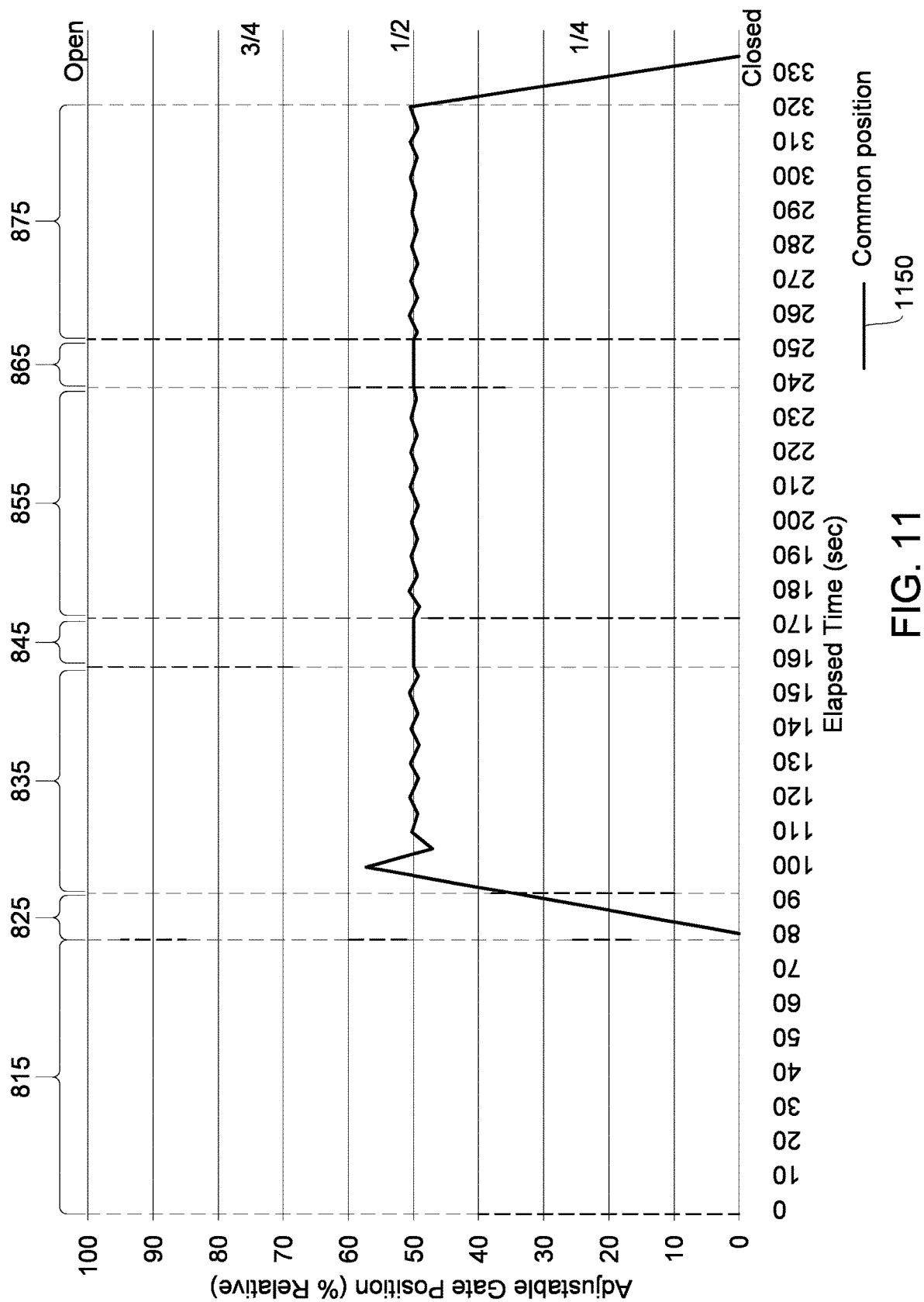
FIG. 11 shows a graphic estimation of the adjustable gate position during the continuous discharge cycle.

Referring now to FIG. 11 in comparison to the graphic performance estimation shown in FIG. 10, the command position 1150 of the adjustable gate 960 may be variably adjusted during the measurement periods and discharge period previously discussed. The adjustable gate 960 moves into a plurality of command positions, between fully opened and fully closed, so that the outflow rate 1080 may closely match the inflow rate 1070 as shown in FIG. 10. Adjustment of the adjustable gate 960 into the plurality of command positions maintains the outflow rate 1080 of the agricultural seed near the inflow rate 1070. The outflow rate 1080 that is measured is defined as a quantity of seed that flows through the lower discharge opening over time during the measurement period. The outflow rate 1080 that is measured may be based on loss-in-weight measurements measured in real-time by the load cells.

The adjustable gate 960 may be in a fixed position during refill periods as previously discussed and shown in FIG. 10. However, system 900 does not necessarily have to be operated in a fixed position mode, where the adjustable gate 960 is placed in a fixed position. Load cells supporting the upper hopper 940 provide weight measurements over time which give readings on the inflow rate 1070 even when the bulk material flow is variable. Alternatively, a metering assembly 530 without the upper hopper but with a lower hopper 525 that has been calibrated, as discussed above, can read the inflow rate 1070 by maintaining the level of bulk material in the lower hopper 525 at the scale set point 420. When utilizing the metering assembly 930 in the fixed position mode, fixing the position of the adjustable gate 960 into a static position maintains an outflow rate 1080 of the agricultural seed that is assumed near the inflow rate 1070. The outflow rate 1080 which is assumed is defined as a quantity of seed that flows through the lower discharge opening over time during the refill period. The outflow rate 1080 may be based on loss-in-weight measurements of the lower hopper 920 previously measured during the measurement period. Alternatively, the outflow rate 1080 may be based on loss-in-weight measurements of the upper hopper 940 during the refill period or from gain-in-weight measurements of the upper hopper 940 previously measured during the measurement period.

During the measurement period, controller 962 may place the system 900 back into the variable position mode. Partially opening and closing the adjustable gate 960 adjusts the outflow rate 1080 to match the inflow rate 1070 that is measured. In turn, a treatment flow rate that is downstream may correlate with the outflow rate 1080 of the seed in real-time.

Figure 12:
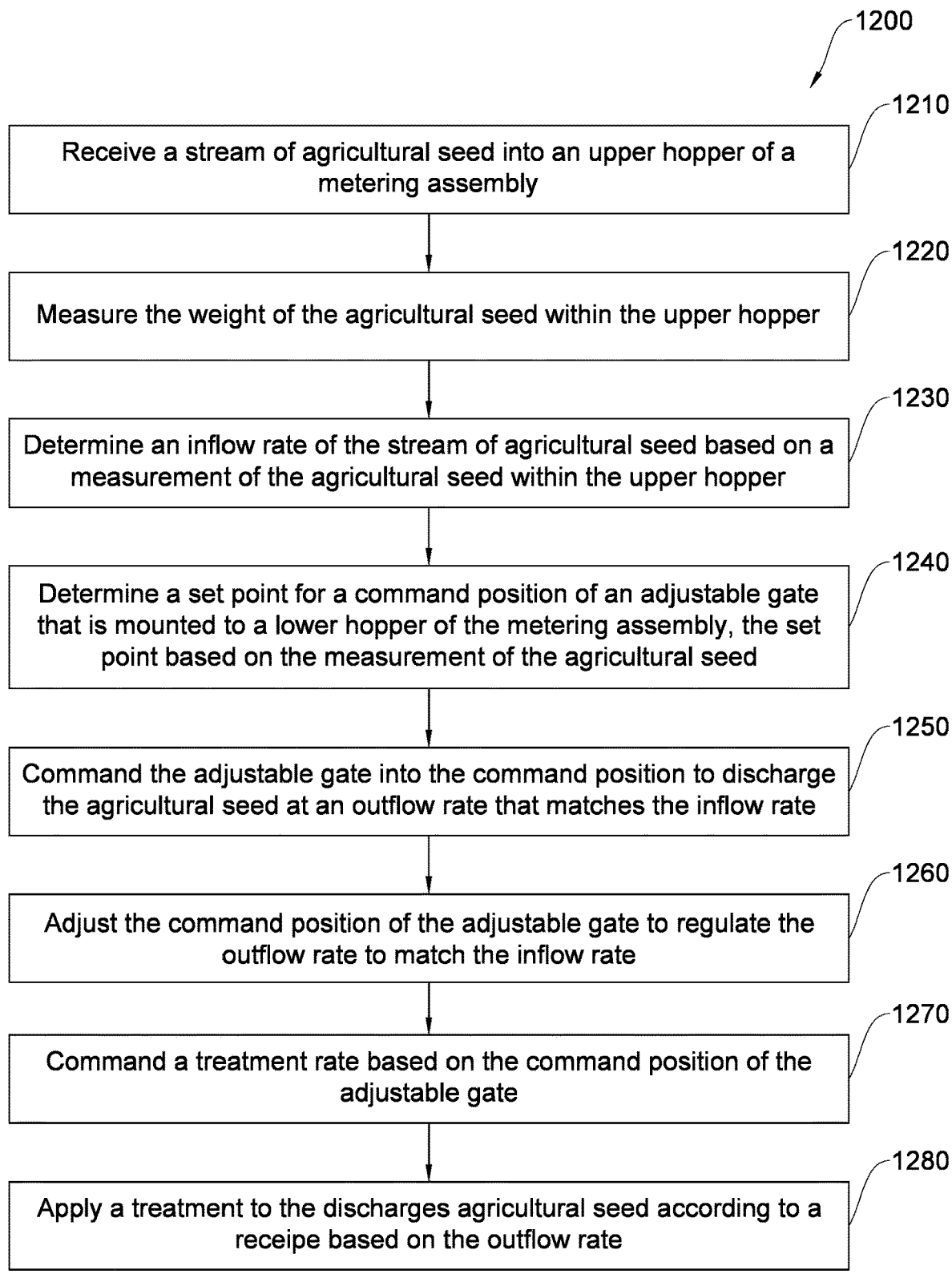
FIG. 12 shows an example flowchart of an automated method for discharging agricultural seed from a metering assembly at an outflow rate that matches the inflow rate.

FIG. 12 is an example flowchart of an automated method 1200 for discharging agricultural seed from the metering assembly at an outflow rate that matches the inflow rate. At step 1210, the metering assembly receives an inflow stream of agricultural seed into an upper hopper of the metering assembly. At step 1220, load cells measure the weight of the agricultural seed within the upper hopper. At step 1230, the metering assembly determines an inflow rate of the stream of agricultural seed based on the measurements of agricultural seed within the metering assembly. At step 1240, a program determines a set point for a command position of an adjustable gate mounted to a lower hopper of the metering assembly. The set point may be based on the measurement of the agricultural seed. At step 1250, the controller commands the adjustable gate into a command position to discharge an outflow stream of agricultural seed from the metering assembly that matches the inflow rate. At step 1260, the controller adjusts the command position of the adjustable gate to regulate an outflow rate of the outflow stream to match the inflow rate of the inflow stream. At step 1270, the controller commands a treatment rate based on the command position of the adjustable gate. At step 1280, a treatment applicator applies a treatment to the discharged agricultural seed. A treatment recipe may be based on the outflow rate according to the command position of the adjustable gate.

Referring now to another example of a continuous discharge cycle 1300, the metering assembly is shown operating chronologically, as shown by arrows 702, 704, 706, 708, and 710, in various periods of operation, as depicted by FIGS. 13A, 13B, 13C, 13D, 13E, 13F. The series of periods may be carried out by the system during the continuous discharge cycle 1300 to maintain a regulated continuous flow of metered seed. The upper hopper 740 receives and discharges a product flow intermittently throughout the continuous discharge cycle 1300. After an initial loading period, the lower hopper 720 continuously dispenses the product. Bulk material may be discharged from the upper hopper 740 during the loading period and the refill period. Bulk material is discharged continuously from the lower hopper 720 during the measurement period and the refill period.

Figures 13A, 13B, 13C:
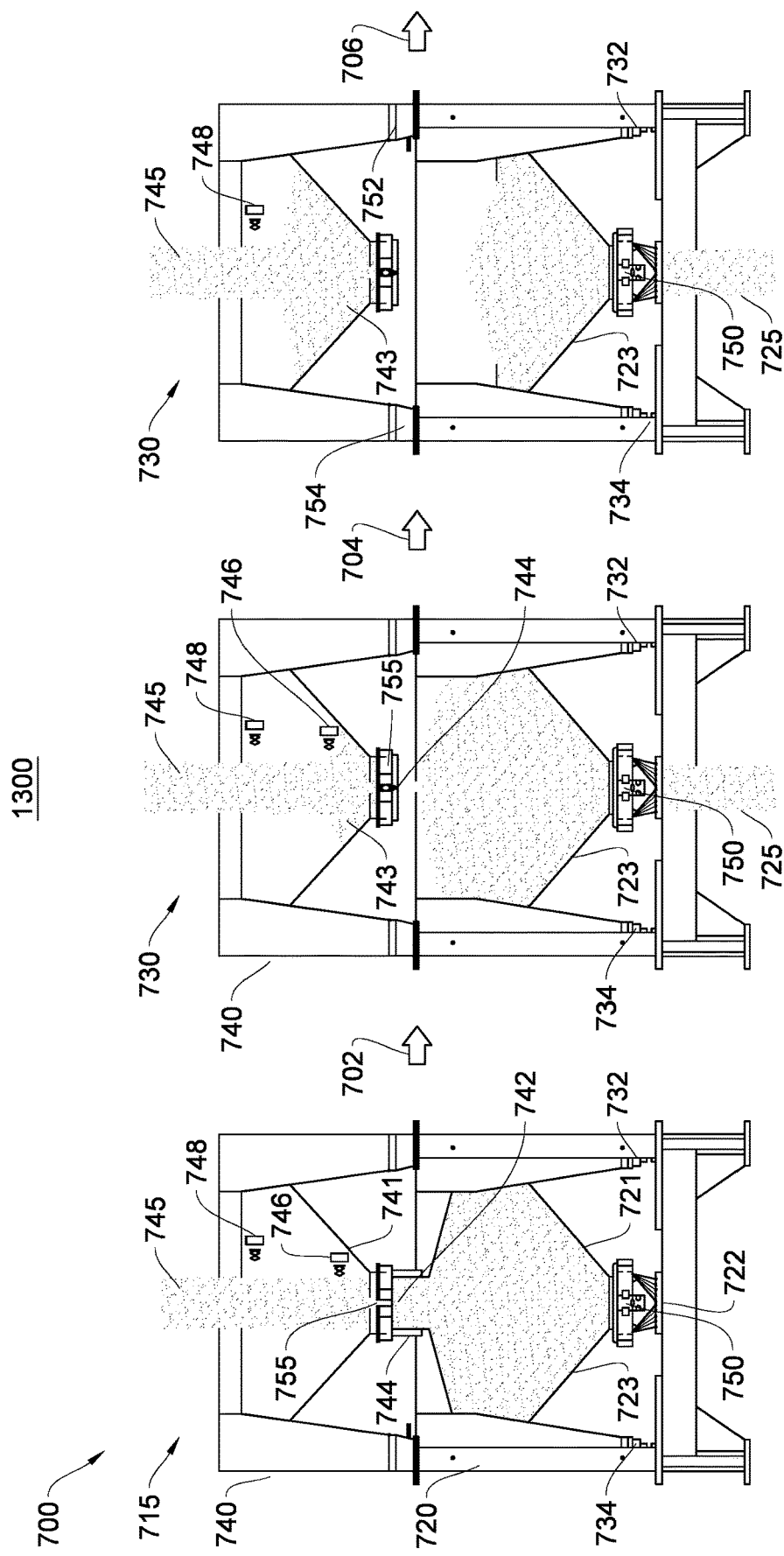
FIG. 13A shows a loading period in a series of chronological depictions of the metering assembly where an inflow stream of bulk material is discharged from the upper hopper to the lower hopper during a continuous discharge cycle.
FIG. 13B shows a first measurement period in a series of chronological depictions of the metering assembly operating under a variable position mode during the continuous discharge cycle.
FIG. 13C shows the first measurement period in a series of chronological depictions of the metering assembly operating under the variable position mode during the continuous discharge cycle.

A loading period 715 is depicted in FIG. 13A. In this period, bulk material is discharged through the upper hopper 740 to load the lower hopper 720. A seed source (not shown for the sake of simplicity) provides an inflow stream 745 of bulk material into the upper hopper 740. The seed source may be supplied by another hopper, a box stand, an auger, a bucket elevator, or input into the system 700 by a conveyor. The inflow stream 745 of bulk material is directed by the upper tapered portion 741 to the upper discharge opening 742 of the upper hopper 740. The inflow stream 745 of bulk material fills the lower hopper 720 when the binary gate 744 of the upper hopper 740 is open. The adjustable gate may be closed during the loading period 715 by the lower control mechanism 750 if the lower hopper 720 is being filled. The inflow stream 745 of bulk material is directed by the upper tapered portion 741 to form a first quantity of bulk material 723. When the first quantity of bulk material 723 reaches a first high-target weight as measured by load cells 732, and 734 supporting the lower hopper 720, the controller transitions the system 700 out of the loading period 715 and into a variable position mode, according to arrow 702. Alternatively, when the first quantity of bulk material 723 reaches a first high-level sensor 728 mounted to the lower hopper 720, the controller transitions the system 700 out of the loading period 715 and into the variable position mode, according to arrow 702.

A first measurement period 730 is depicted in FIG. 13B. During the first transition into the first measurement period 730, the controller commands the binary gate 744 closed by the upper control mechanism 755. The controller begins adjusting the adjustable gate by the lower control mechanism 750 proportionally based on the gravimetric readings to achieve and maintain a selected seed flow rate during the first measurement period 730. To regulate seed flow rates based on real-time measurements, the controller monitors the rate of change on the load cells 732, and 734 as seed flows from the lower hopper 720 during the continuous discharge cycle 1300. The controller compares the inflow rate calculations and adjusts the adjustable gate accordingly to provide an outflow stream 725 of agricultural seed at an outflow rate that matches the inflow rate. The controller adjusts the lower control mechanism 750 based on electrical signals that are proportional to the mass of the bulk material as read by the load cells 732, and 734 to command the positioning of the adjustable gate.

During the first measurement period 730, the first quantity of bulk material 723 is directed by the lower tapered portion 721 to flow through the lower discharge opening 722 of lower hopper 720 as the outflow stream 725 of bulk material. During this period, the bulk material is discharged gravimetrically from the lower hopper 720 based on the loss-in-weight measurements. Meanwhile, the inflow stream 745 of bulk material begins to form a second quantity of bulk material 743 within the upper hopper 740 when the binary gate 744 is closed. Bulk material is not discharged into the lower hopper 720 from the upper hopper 740 during the first measurement period 730. Bulk material continues to discharge from the lower hopper 720 to the seed receiving equipment (not shown for the sake of simplicity) during the second transition, according to arrow 704 in FIG. 13C.

When the second quantity of bulk material 743 reaches a second high-target weight as measured by load cells 752, and 754 supporting the upper hopper 740, the controller may transition the system out of the variable position mode and into a fixed position mode, according to arrow 706. Opening of the binary gate 744 of the upper hopper 740 may occur when the second high-target weight is sensed by load cells 752, and 754. The second quantity of bulk material 743 fills the lower hopper 720 when the binary gate 744 of the upper hopper 740 is open. During this second transition, the adjustable gate may be moved into a fixed position by a lower control mechanism 750.

Alternatively, or in combination with measurements by the load cells, when the second quantity of bulk material 743 reaches a second high-level sensor 748 within the upper hopper 740 or the first quantity of bulk material 723 reaches a first low-level sensor 726 within the lower hopper 720, the controller may transition the system 700 out of the variable position mode and into a fixed position mode, according to arrow 706. Opening of the upper hopper 740, when the second high-level sensor 748 is triggered, may allow for a volumetric measurement estimate of the second quantity of bulk material 743. During this second transition, the adjustable gate may be moved into a fixed position by the lower control mechanism 750.

As system 700 completes the transition into a first refill period 760, as shown in FIG. 13D, bulk material may begin to discharge at a constant rate from the lower hopper 720. System 700 may be engaged in the fixed position mode during the first refill period 760. Bulk material continues to discharge from the upper hopper 740 into the lower hopper 720 while bulk material discharges from the lower hopper 720 to the seed receiving equipment. Bulk material may continue to discharge from the seed transfer equipment to the upper hopper 740 during the first refill period 760, as shown in FIG. 13D. The inflow stream 745 of bulk material 21 fills the upper hopper 740 while the binary gate 744 of the upper hopper 740 is open.

Bulk material may cease to discharge from the seed transfer equipment to the upper hopper 740 during the first refill period 760, as shown in FIG. 13E, which may allow for a gravimetric measurement of the second quantity of bulk material 743. The discharge from the seed transfer equipment may depend on the second target weight-level being sensed by load cells 752, and 754 of the upper hopper 740. Alternatively, or in combination with measurements by the load cells, the discharge from the seed transfer equipment may depend on a signal from the second high-level sensor 748 in the upper hopper 740.

When a third quantity of bulk material 763 reaches the first high target weight within the lower hopper 720 as measured by load cells 732, 734 or the second quantity of bulk material 743 reaches a second low-target weight within the upper hopper 740 as measured by load cells 752, 754, the controller converts the system 700, if in the fixed position mode, back into the variable position mode, according to arrow 710. During this transition, the controller commands the upper control mechanism 755 to close the binary gate 744. The adjustable gate returns to being proportionally adjusted by the lower control mechanism 750 based on the controller receiving real-time gravimetric readings.

Alternatively, or in combination with measurements by the load cells, when the third quantity of bulk material 763 reaches the first high-level sensor 728 within the lower hopper 720 or the second quantity of bulk material 743 reaches a second low-level sensor 746 within the upper hopper 740, the controller converts the system 700, if in the fixed position mode, back into the variable position mode, according to arrow 710. During this transition, the controller commands the upper control mechanism 755 to close the binary gate 744. The adjustable gate returns to being proportionally adjusted by the lower control mechanism 750 based on the controller receiving real-time gravimetric readings.

A second measurement period 770 is depicted in FIG. 13F. During the second measurement period, the third quantity of bulk material 763 flows through the lower discharge opening 722 of the lower hopper 720 as the outflow stream 725 of bulk material continues. The third quantity of bulk material 763 is discharged gravimetrically from the lower hopper 720 based on the loss-in-weight measurements. Meanwhile, the inflow stream 745 of bulk material may begin to form a fourth quantity of bulk material 783 within the upper hopper 740 when the binary gate 744 is closed. Alternatively, the inflow stream 745 of bulk material may be stopped and a discharge period started. In the discharge period, a last quantity of bulk material may flow through the lower discharge opening 722 with the system 700 in the variable position mode. The discharge period continues until the outflow stream 725 discharges the last quantity of bulk material from the lower hopper 720 into the seed receiving equipment (not shown for the sake of simplicity).

It is understood that the invention is not confined to the particular construction and arrangement of parts herein described. That although the drawings and specification set forth a preferred embodiment, and although specific terms are employed, they are used in a description sense only and embody all such forms as come within the scope of the following claims.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims.

For the convenience of the reader, the above description has focused on a representative sample of all possible embodiments, a sample that teaches the principles of the invention and conveys the best mode contemplated for carrying it out. Throughout this application and its associated file history, when the term "invention" is used, it refers to the entire collection of ideas and principles described; in contrast, the formal definition of the exclusive protected property right is set forth in the claims, which exclusively control. The description has not attempted to exhaustively enumerate all possible variations. Other undescribed variations or modifications may be possible. Where multiple alternative embodiments are described, in many cases it will be possible to combine elements of different embodiments, or to combine elements of the embodiments described here with other modifications or variations that are not expressly described. A list of items does not imply that any or all of the items are mutually exclusive, nor that any or all of the items are comprehensive of any category, unless expressly specified otherwise. In many cases, one feature or group of features may be used separately from the entire apparatus or methods described. Many of those undescribed variations, modifications and variations are within the literal scope of the following claims, and others are equivalent.

In the foregoing description, it will be readily appreciated by those skilled in the art that modifications may be made to the invention without departing from the concepts disclosed herein. Such modifications are to be considered as included in the following claims, unless these claims by their language expressly state otherwise.

All terms used in the claims are intended to be given their ordinary meanings as understood by those knowledgeable in the technologies described herein unless an explicit indication to the contrary is made herein. In particular, the use of the singular article such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

We claim:

1. An automated method comprising the steps of:
   a. receiving a stream of agricultural seed into a metering assembly;
   b. determining an inflow rate of the stream of agricultural seed into the metering assembly, wherein the inflow rate is based on a measurement of the agricultural seed within the metering assembly; and
   c. commanding an adjustable gate into a command position to discharge the agricultural seed from the metering assembly at an outflow rate that matches the inflow rate.

2. The automated method of claim 1, further comprising the steps of:
   a. receiving the stream of agricultural seed as a continuous stream into an upper hopper of the metering assembly, wherein a binary gate mounted to the upper hopper is closed;
   b. measuring the weight of the agricultural seed within the upper hopper; and
   c. opening the binary gate to discharge the agricultural seed from the upper hopper into a lower hopper of the metering assembly.

3. The automated method of claim 2, further comprising the step of:
   a. adjusting the command position of the adjustable gate, wherein the adjustable gate is mounted to the lower hopper, to regulate the outflow rate from the lower hopper in response to variations of the inflow rate of the agricultural seed received into the upper hopper.

4. The automated method of claim 3, wherein the adjustable gate is disposed below the binary gate and is continuously adjusted while the binary gate is closed.

5. The automated method of claim 3, further comprising the steps of:
   a. determining a set point for the command position of the adjustable gate while the binary gate is closed, wherein the set point is based on the measurement of the agricultural seed within the metering assembly; and
   b. setting the command position of the adjustable gate at the set point when the binary gate is opened.

6. The automated method of claim 5, further comprising the step of:
   a. maintaining the command position of the adjustable gate at the set point during a refill period.

7. The automated method of claim 1, further comprising the steps of:
   a. maintaining the command position of the adjustable gate at a set point until a load cell mounted to the metering assembly reports a change-in-weight over a refill period.

8. The automated method of claim 7, wherein the refill period is an interval of time between 0.1 second and 10 minutes.

9. The automated method of claim 1, further comprising the step of:
   a. decreasing an opening created by the adjustable gate upon a loss-in-weight of the metering assembly over a measurement period.

10. The automated method of claim 1, further comprising the step of:
    a. increasing an opening created by the adjustable gate upon a gain-in-weight of the metering assembly over a measurement period.

11. The automated method of claim 1, further comprising the step of:
    a. commanding a treatment rate based on the command position of the adjustable gate.

12. The automated method of claim 11, further comprising the step of:
    a. applying a treatment to the agricultural seed discharged according to a recipe based on the outflow rate.

13. The automated method of claim 1, further comprising the steps of:
    a. increasing a treatment rate in response to an increase in an opening of the adjustable gate; and
    b. decreasing the treatment rate in response to a decrease in the opening of the adjustable gate.

14. The automated method of claim 1, wherein the inflow rate is determined based on a measurement of weight during a measurement period between receiving a low-level signal and a high-level signal.

15. The automated method of claim 1, further comprising the step of:
    a. maintaining a fill-level within the metering assembly to determine the inflow rate.

16. The automated method of claim 1, further comprising the steps of:
    a. filling the metering assembly with agricultural seed at a percentage range of between 5 percent to 80 percent of the maximum capacity of the metering assembly.

17. The automated method of claim 16, further comprising the step of:
    a. adjusting the command position of the adjustable gate to maintain the agricultural seed within the metering assembly at the percentage range of between 5 percent to 80 percent of the maximum capacity.

18. The automated method of claim 16, further comprising the steps of:
    a. measuring the weight of the agricultural seed within the metering assembly;
    b. receiving a plurality of weight measurements of the metering assembly; and
    c. regulating the command position of the adjustable gate based upon the plurality of weight measurements in real time.

19. The automated method of claim 18, further comprising the steps of:
    a. setting the command position of the adjustable gate at a set point during a calibration period;
    b. discharging, over the calibration period, a portion of the agricultural seed through an opening created by the adjustable gate at the command position; and
    c. associating the outflow rate with the command position of the adjustable gate at the set point.

20. The automated method of claim 19, further comprising the step of:
    a. obtaining a plurality of outflow rates that correspond with a plurality of command positions of the adjustable gate.

21. The automated method of claim 20, further comprising the step of:

a. storing the plurality of outflow rates that correspond with the plurality of command positions in a database accessible by a controller.

22. The automated method of claim 16, further comprising the step of:
   a. adjusting a treatment rate according to a recipe based on the outflow rate.

23. The automated method of claim 22, further comprising the step of:
   a. generating a signal upon a change in the command position of the adjustable gate to a second position; and
   b. adjusting the treatment rate to correspond with the outflow rate correlated with the second position upon generation of the signal.

24. The automated method of claim 1, further comprising the steps of:
   a. receiving the measurement from a fill-level sensor in response to a fill-level of the agricultural seed within the metering assembly.

25. The automated method of claim 24, further comprising the steps of:
   a. increasing an opening of the adjustable gate upon receipt of a high-level signal generated by the fill-level sensor; and
   b. decreasing the opening of the adjustable gate upon receipt of a low-level signal generated by the fill-level sensor.

26. The automated method of claim 24, further comprising a calibration subprocess comprising the steps of:
   a. receiving a low-level signal from the fill-level sensor related to the agricultural seed beginning to fill the metering assembly that starts empty;
   b. receiving a high-level signal from the fill-level sensor related to the agricultural seed filling the metering assembly; and
   c. calculating the inflow rate into the metering assembly based on the time between receiving the low-level signal and the high-level signal.

27. The automated method of claim 26, wherein the calibration subprocess further comprises the steps of:
   a. calculating a total weight as the difference between a subsequent weight value corresponding to the high-level signal and an initial weight value corresponding to the low-level signal.

28. The automated method of claim 1, further comprising the step of:
   a. constraining the outflow rate between a preset discharge rate minimum and a preset discharge rate maximum by a controller based on the inflow rate.

29. The automated method of claim 28, further comprising the step of:
   a. adjusting the command position of the adjustable gate based on a plurality of loss-in-weight measurements of the metering assembly measured in real-time.

30. The automated method of claim 1, further comprising the step of:
   a. applying a liquid treatment to the agricultural seed discharged from the metering assembly at a treatment rate in response to the outflow rate.

31. The automated method of claim 1, further comprising a calibration subprocess comprising the steps of:
   a. filling the metering assembly with the stream of agricultural seed to a first fill-level;
   b. dispensing the agricultural seed from the first fill-level;
   c. measuring the difference in weight of the agricultural seed within the metering assembly;
   d. calculating the inflow rate based on the difference in weight measured over time to determine a first calibration value; and
   e. associating the first calibration value with the first fill-level.

32. The automated method of claim 1, wherein the inflow rate and the outflow rate are determined from a same hopper of the metering assembly that received and discharged the stream of agricultural seed.

* * * * *